US012542227B2

(12) United States Patent
Suzuki

(10) Patent No.: US 12,542,227 B2
(45) Date of Patent: Feb. 3, 2026

(54) R-T-B BASED PERMANENT MAGNET

(71) Applicant: TDK Corporation, Tokyo (JP)

(72) Inventor: Kenichi Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 733 days.

(21) Appl. No.: 17/980,826

(22) Filed: Nov. 4, 2022

(65) Prior Publication Data

US 2023/0144957 A1 May 11, 2023

(30) Foreign Application Priority Data

Nov. 9, 2021 (JP) ................................ 2021-182538
Sep. 5, 2022 (JP) ................................ 2022-140853

(51) Int. Cl.
*H01F 1/057* (2006.01)
*C22C 28/00* (2006.01)
*C22C 30/00* (2006.01)

(52) U.S. Cl.
CPC ........... *H01F 1/0577* (2013.01); *C22C 28/00* (2013.01); *C22C 30/00* (2013.01); *C22C 2202/02* (2013.01)

(58) Field of Classification Search
None
See application file for complete search history.

(56) References Cited

U.S. PATENT DOCUMENTS 5,788,782 A * 8/1998 Kaneko ................ C22C 1/0441 148/101
2007/0199623 A1* 8/2007 Suzuki ................ H01F 10/126 428/692.1
2015/0279527 A1* 10/2015 Suzuki ................ C22C 38/002 420/83
2015/0279528 A1* 10/2015 Suzuki ................ H01F 1/0577 335/302
2017/0278602 A1* 9/2017 Iwasa ..................... C22C 38/16
2017/0278609 A1 9/2017 Hagiwara et al.
2018/0294079 A1* 10/2018 Takeda .................... H01F 1/057
2018/0294080 A1* 10/2018 Miyazaki ............. C22C 38/005
2021/0304929 A1* 9/2021 Miwa ...................... H01F 1/057
2022/0199299 A1* 6/2022 Liu ..................... H01F 41/0253
2022/0199300 A1* 6/2022 Suzuki .................... C22C 30/00
(Continued)

FOREIGN PATENT DOCUMENTS

JP 2005-198365 A 7/2005
JP 2017-174962 A 9/2017

*Primary Examiner* — Brian D Walck
(74) *Attorney, Agent, or Firm* — Faegre Drinker Biddle & Reath LLP

(57) ABSTRACT

A permanent magnet contains main phase grains. The main phase grains include Nd, Fe, and B. In a cross-section of the permanent magnet, voids are formed. The cross-section is approximately parallel to an easy magnetization axis direction of the permanent magnet. An area ratio of the voids in the cross-section is from 1% to 5%. A direction orthogonal to the easy magnetization axis direction in the cross-section is expressed as AB direction. A direction in which each of the voids extends in the cross-section is expressed as VD. An angle between AB direction and VD is expressed as θ. A horizontal axis of a frequency distribution of the voids in the cross-section represents the θ. A range of the horizontal axis of the frequency distribution is from 0° to 180°. The frequency distribution is maximum in a range of θ of from 60° to 120°.

6 Claims, 9 Drawing Sheets

(56) References Cited

U.S. PATENT DOCUMENTS

| | | | | |
|---|---|---|---|---|
| 2022/0199301 | A1* | 6/2022 | Suzuki | H01F 1/0576 |
| 2023/0147967 | A1* | 5/2023 | Liu | C22C 38/005<br>335/302 |

* cited by examiner

R-T-B BASED PERMANENT MAGNET

TECHNICAL FIELD

The present disclosure relates to an R-T-B based permanent magnet.

BACKGROUND

The R-T-B based permanent magnet includes a rare-earth element R (Nd or the like), a transition metal element T (Fe or the like), and boron (B). The R-T-B based permanent magnet is more excellent in magnetic characteristics in comparison to a permanent magnet in the related art (for example, a ferrite magnet), and thus the R-T-B based permanent magnet is frequently used in a motor mounted in an electric vehicle, a hybrid vehicle, and the like. For example, the R-T-B based permanent magnet constitutes a rotor of an interior permanent magnet (IPM) motor or a surface permanent magnet (SPM) motor. A plurality of the R-T-B based permanent magnets are arranged along a peripheral direction of the rotor, and an easy magnetization axis direction of each of the R-T-B based permanent magnets is arranged vertically to a rotary axial line of the rotor. Among surfaces of the R-T-B based permanent magnets, a surface (surface corresponding to a magnetic pole) that is approximately orthogonal to the easy magnetization axis direction faces a stator surrounding the rotor. An external magnetic field H that is approximately parallel to the easy magnetization axis direction of each of the R-T-B based permanent magnets occurs in the stator. The rotator rotates by an attractive force and a repulsive force between the stator and each of the R-T-B based permanent magnets according to a variation of the external magnetic field H applied to a surface of each of the R-T-B based permanent magnets.

As illustrated in FIG. 1A, an eddy current I due to electromagnetic induction is generated in the R-T-B based permanent magnet 2 in accordance with a variation of the external magnetic field H applied to the R-T-B based permanent magnet 2. According to a Lenz' law, the eddy current I due to the electromagnetic induction flows so that a magnetic field that hinders the variation of the external magnetic field H is generated. A direction of the external magnetic field H is approximately parallel to an easy magnetization axis direction C of the R-T-B based permanent magnet 2, and thus the eddy current I according to the variation of the external magnetic field H circulates in a direction that is approximately orthogonal to the easy magnetization axis direction C.

The R-T-B based permanent magnet is a metal magnet, and thus an electric resistivity of the R-T-B based permanent magnet is significantly lower than an electric resistivity of a ferrite magnet composed of a metal oxide. Accordingly, in a motor that uses the R-T-B based permanent magnet in the related art, joule heat is likely to occur due to the eddy current, and motor efficiency is likely to deteriorate. Accordingly, an attempt has been made to reduce an eddy current loss in the R-T-B based permanent magnet for a motor.

For example, Japanese Unexamined Patent Publication No. 2005-198365 discloses an R-T-B based permanent magnet composed of a plurality of plate-shaped permanent magnets stacked through a non-conductive resin. According to the R-T-B based permanent magnet disclosed in Japanese Unexamined Patent Publication No. 2005-198365, the plurality of plate-shaped permanent magnets are insulated by the non-conductive resin, and an eddy current flowing between the plurality of plate-shaped permanent magnets is suppressed. For example, Japanese Unexamined Patent Publication No. 2017-174962 discloses an R-T-B based permanent magnet composed of a magnet element body and a resistive layer (oxide layer) formed on a surface of the magnet element body. According to the R-T-B based permanent magnet disclosed in Japanese Unexamined Patent Publication No. 2017-174962, the resistive layer (oxide layer) suppresses the eddy current.

SUMMARY

The present inventor has studied a method of raising an electric resistivity of an R-T-B based permanent magnet in a direction that is approximately orthogonal to an easy magnetization axis direction C so as to suppress an eddy current in the direction that is approximately orthogonal to the easy magnetization axis direction C. The present inventor found that the electric resistivity of the R-T-B based permanent magnet in the direction that is approximately orthogonal to the easy magnetization axis direction C increases in accordance with formation of a plurality of voids extending in a predetermined direction in the R-T-B based permanent magnet. However, in accordance with formation of the plurality of voids in the R-T-B based permanent magnet, a volume ratio of a plurality of main phase grains in the R-T-B based permanent magnet relatively decreases, and orientation of each of the main phase grains in the easy magnetization axis direction C is likely to be impaired. As a result, magnetic characteristics such as a residual magnetic flux density is impaired. Accordingly, a high electric resistivity and excellent magnetic characteristics are required to be compatible with each other.

An object of an aspect of the present invention is to provide an R-T-B based permanent magnet having a high electric resistivity in a direction that is approximately orthogonal to an easy magnetization axis direction, and having excellent magnetic characteristics.

For example, an aspect of the present invention relates the following R-T-B based permanent magnet.

[1] An R-T-B based permanent magnet including a rare-earth element R, a transition metal element T, and B, wherein the R-T-B based permanent magnet includes at least Nd as the R, the R-T-B based permanent magnet includes at least Fe as the T, the R-T-B based permanent magnet contains a plurality of main phase grains, the plurality of main phase grains include at least the R, the T, and B, a plurality of voids are formed in a cross-section of the R-T-B based permanent magnet, the cross-section is approximately parallel to an easy magnetization axis direction of the R-T-B based permanent magnet, an area ratio of the plurality of voids in the cross-section is from 1% to 5%, a direction orthogonal to the easy magnetization axis direction in the cross-section is expressed as AB direction, a direction in which each of the plurality of voids extends in the cross-section is expressed as VD, an angle between the AB direction and the VD is expressed as θ, a horizontal axis of a frequency distribution of the plurality of voids in the cross-section represents the θ, a range of the horizontal axis of the frequency distribution is from 0° to 180°, and the frequency distribution is maximum in a range of θ of from 60° to 120°.

[2] The R-T-B based permanent magnet according to [1], wherein the plurality of main phase grains are flat in the cross-section, and the plurality of main phase grains are stacked along the easy magnetization axis direction.

[3] The R-T-B based permanent magnet according to [1] or [2], wherein an average value of a length of a short axis of the plurality of main phase grains in the cross-section is from 20 nm to 200 nm.

[4] The R-T-B based permanent magnet according to any one of [1] to [3], wherein a content of R in the R-T-B based permanent magnet is from 28 mass % to 33 mass %, and a content of B n the R-T-B based permanent magnet is from 0.8 mass % to 1.1 mass %.

[5] The R-T-B based permanent magnet according to any one of [1] to [4], wherein the R-T-B based permanent magnet is a hot deformed magnet.

[6] The R-T-B based permanent magnet according to any one of [1] to [5], wherein a width of the R-T-B based permanent magnet in the easy magnetization axis direction is expressed as t, a surface portion of the R-T-B based permanent magnet is defined as a portion where a depth from a surface of the R-T-B based permanent magnet in the easy magnetization axis direction is from 0 to 0.25t, an area ratio of the plurality of voids in the surface portion is expressed as ARs %, the ARs is measured in the surface portion exposed on the cross-section, a central portion of the R-T-B based permanent magnet is defined as a portion where the depth from the surface of the R-T-B based permanent magnet in the easy magnetization axis direction is more than 0.25t and 0.5t or less, an area ratio of the plurality of voids in the central portion is expressed as ARc %, the ARc is measured in the central portion exposed on the cross-section, and ARs-ARc is from 1.0% to 4.0%.

According to the present invention, an R-T-B based permanent magnet having a high electric resistivity in a direction that is approximately orthogonal to an easy magnetization axis direction, and having excellent magnetic characteristics is provided.

DETAILED DESCRIPTION

Figure 5:
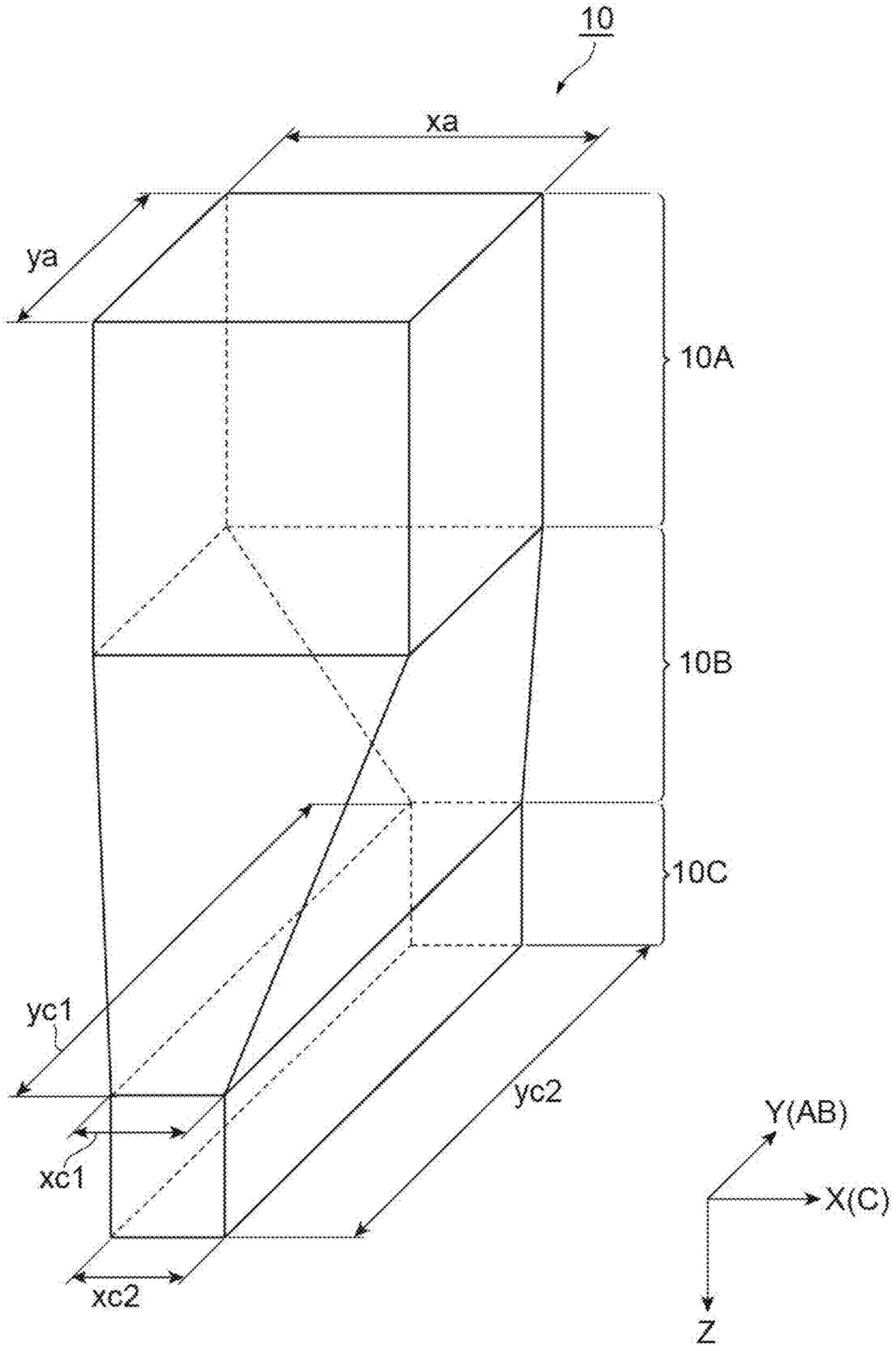
FIG. 5 is a perspective view of a cavity 10 formed in a mold that is used in a method of producing the R-T-B based permanent magnet 2.

Hereinafter, an appropriate embodiment of the present invention will be described with reference to the accompanying drawings. In the drawings, the same reference numeral will be given to the equivalent constituent elements. The present invention is not limited to the following embodiment. "Permanent magnet" in the following description represents an R-T-B based permanent magnet. A unit of a concentration of each element in the permanent magnet in the following description is atomic %. X, Y, and Z in FIG. 5 represent three coordinate axes orthogonal to each other.

(Permanent Magnet)

The permanent magnet according to this embodiment includes at least a rare-earth element (R), a transition metal element (T), and boron (B). The permanent magnet according to this embodiment is a hot deformed magnet. However, the permanent magnet according to another aspect of the present invention may be a sintered magnet.

The permanent magnet includes at least neodymium as the rare-earth element R. The permanent magnet may include another rare-earth element R in addition to Nd. The other rare-earth element R included in the permanent magnet may be at least one kind selected from the group consisting of scandium (Sc), yttrium (Y), lanthanum (La), cerium (Ce), praseodymium (Pr), samarium (Sm), europium (Eu), gadolinium (Gd), terbium (Tb), dysprosium (Dy), Holmium (Ho), Erbium (Er), Thulium (Tm), Ytterbium (Yb), and Lutetium (Lu). The permanent magnet 2 does not have to include heavy rare-earth elements (for example, neither Dy nor Tb).

The permanent magnet includes at least iron (Fe) as the transition metal element T. The permanent magnet may include only Fe as the transition metal element T. The permanent magnet may include both Fe and cobalt (Co) as the transition metal element T.

Figure 1A:
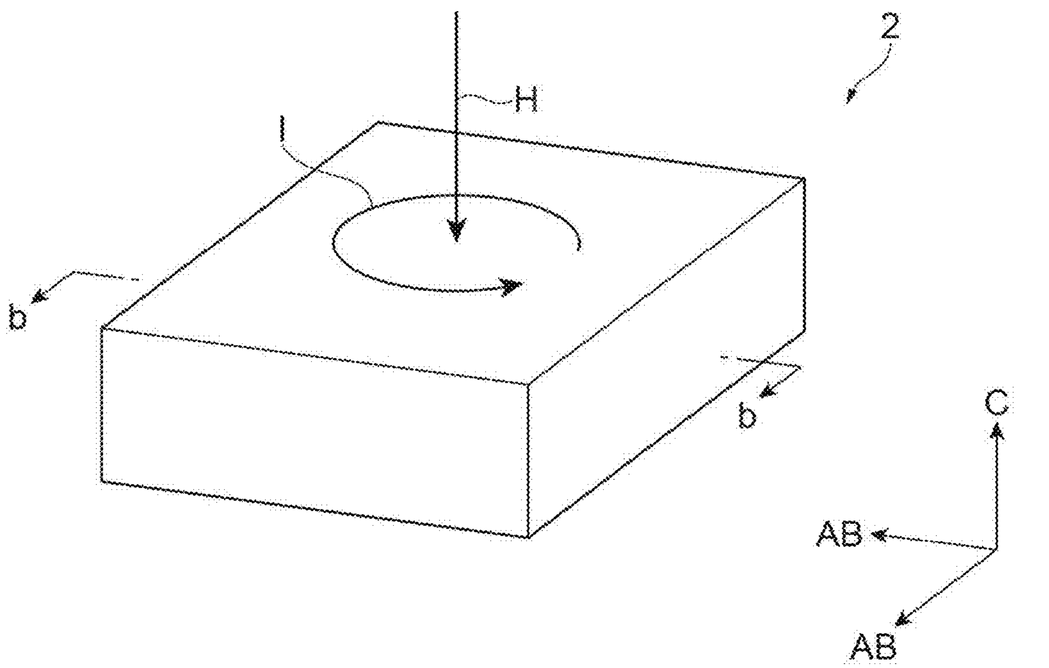
FIG. 1A is a schematic perspective view of an R-T-B based permanent magnet 2 according to an embodiment of the present invention.
Figure 1B:
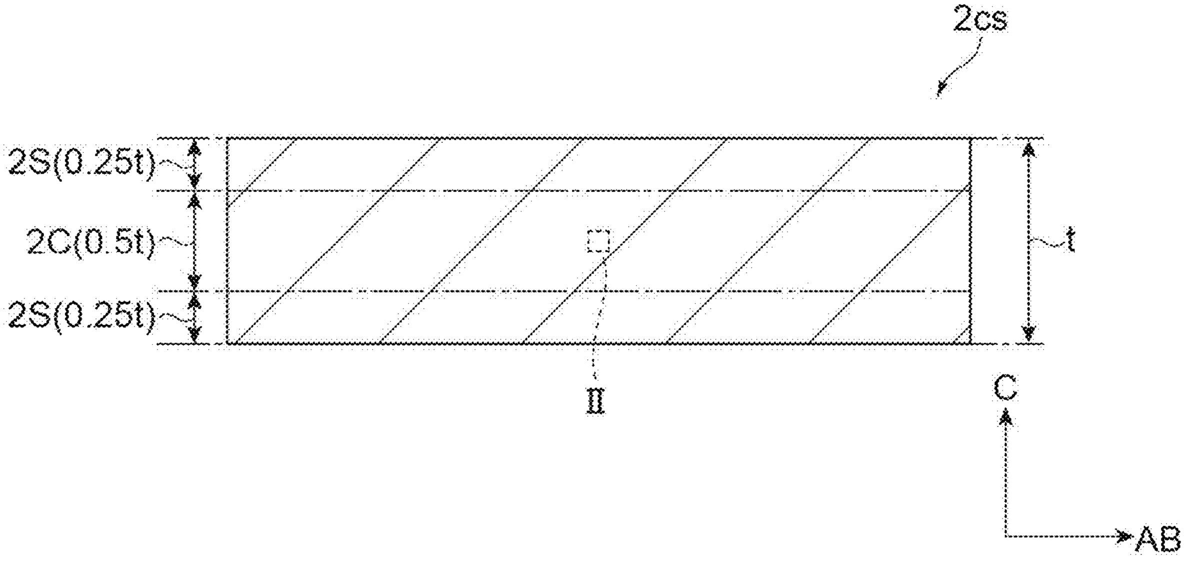
FIG. 1B is a schematic view of a cross-section 2*cs* of the R-T-B based permanent magnet 2 (an arrow view in a b-b line direction in the R-T-B based permanent magnet 2).

FIG. 1A is a perspective view of the permanent magnet 2 according to this embodiment, and FIG. 1B is a schematic view of a cross-section 2*cs* of the permanent magnet 2. The cross-section 2*cs* of the permanent magnet 2 is approximately parallel to an easy magnetization axis direction C of the permanent magnet 2. The easy magnetization axis direction C is a direction parallel to a straight line connecting a pair of magnetic poles of the permanent magnet 2. That is, the easy magnetization axis direction C is a direction oriented from an S-pole of the permanent magnet 2 to an N-pole of the permanent magnet 2. The easy magnetization axis direction C may be specified on the basis of measurement of a magnetic flux distribution of the permanent magnet 2. The easy magnetization axis direction C may be specified on the basis of measurement of a magnetic flux distribution of an analysis sample separated from the permanent magnet 2.

The permanent magnet 2 according to this embodiment is a rectangular parallelepiped (plate). However, a shape of the permanent magnet 2 is not limited to the rectangular parallelepiped. For example, the shape of the permanent magnet 2 may be a cube, a polygonal column, an arc segment, an annular sector, a sphere, a disk, a circular column, a tube, or a ring. A shape of the cross-section 2*cs* of the permanent magnet 2 may be, for example, a polygon, a circular arc (circular chord), a bow shape, an arch shape, a C-shape, or a circle.

Figure 2:
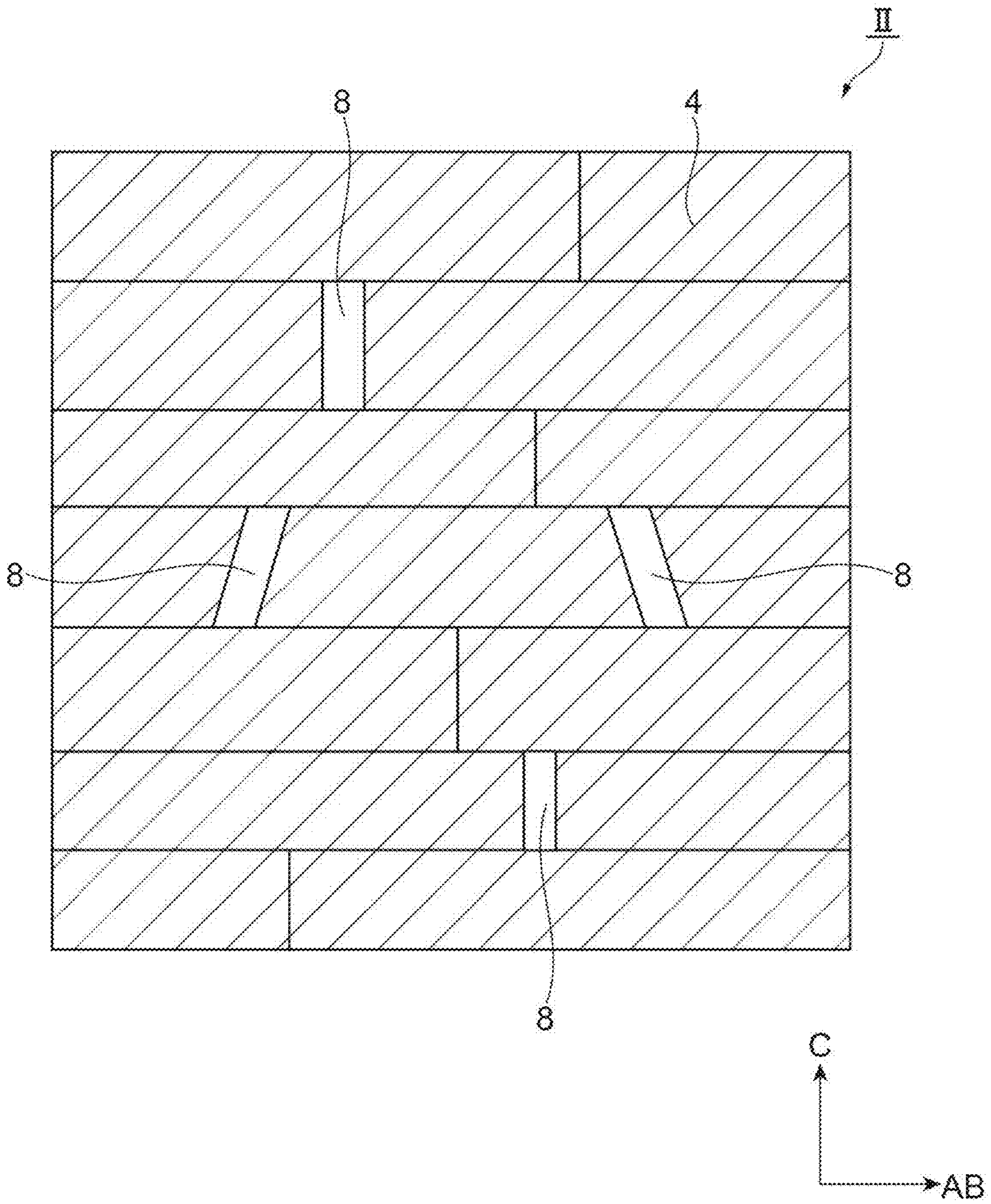
FIG. 2 is an enlarged view of a part (region II) of the cross-section 2*cs* illustrated in FIG. 1B.

FIG. 2 is an enlarged view of a part (region II) of the cross-section 2*cs* illustrated in FIG. 1B. As illustrated in FIG. 2, the permanent magnet 2 contains a plurality of main phase grains 4.

A plurality of voids 8 are formed in a cross-section 2*cs* that is approximately parallel to the easy magnetization axis direction C. The plurality of voids 8 may also be referred to as a plurality of pores. At least a part of the plurality of voids 8 may be formed in a two-grain boundary. At least a part of the plurality of voids 8 may be formed in a grain boundary multiple junction. A direction that is approximately orthogonal to the easy magnetization axis direction C in the cross-section 2*cs* that is approximately parallel to the easy magnetization axis direction C is noted as "AB direction".

Figure 3A:
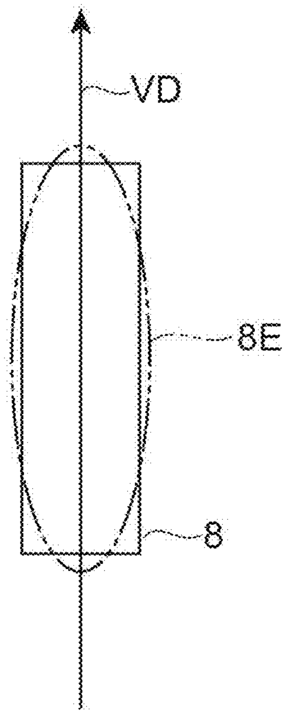
FIG. 3A and FIG. 3B are schematic views illustrating a direction VD in which each of a plurality of voids 8 formed in the R-T-B based permanent magnet 2 extends.
Figure 3B:
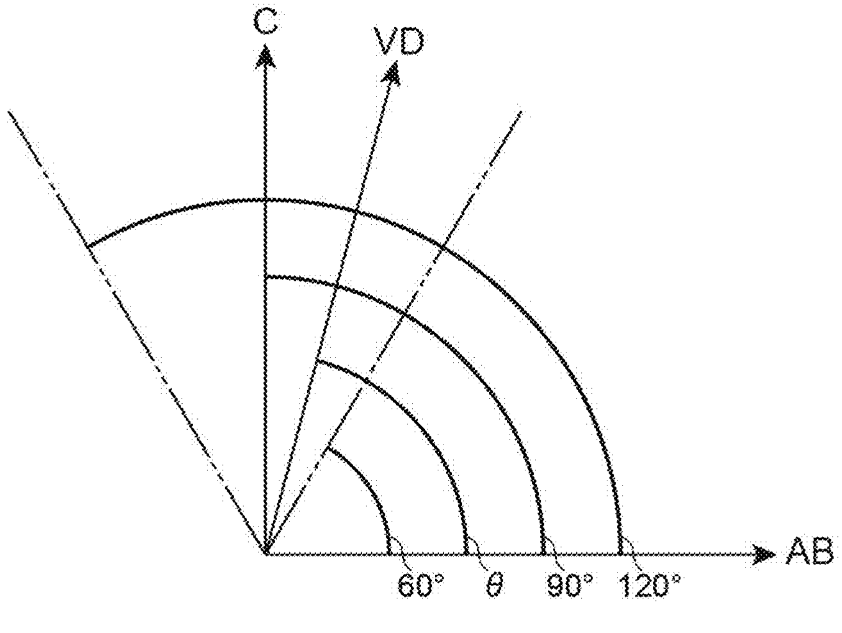

As illustrated in FIG. 3A and FIG. 3B, a direction in which each of the plurality of voids 8 extend in the cross-section 2*cs* is noted as "VD". The direction in which each of the voids 8 extends may be referred to as a longitudinal direction of each of the voids 8. A shape (contour) of each of the voids 8 in the cross-section 2*cs* may be approximated by an ellipse 8E. Approximation of the shape of each of the voids 8 by the ellipse 8E may be carried out by least squares fitting. A long axis direction of the ellipse 8E that approximates the shape of each of the voids 8 may be regarded as the VD. An angle between the AB direction and the VD is expressed as θ (unit: °). A void having θ of from 60° to 120° may be referred to as a void extending along the easy magnetization axis direction C. The void having θ of from 60° to 120° is noted as a "C axis extending void". A void having θ of less than 60° and a void having θ of more than 120° may be referred to as a void extending along the AB direction. The void having θ of less than 60° and the void having θ of more than 120° are noted as "AB axis extending void".

Figure 4A:
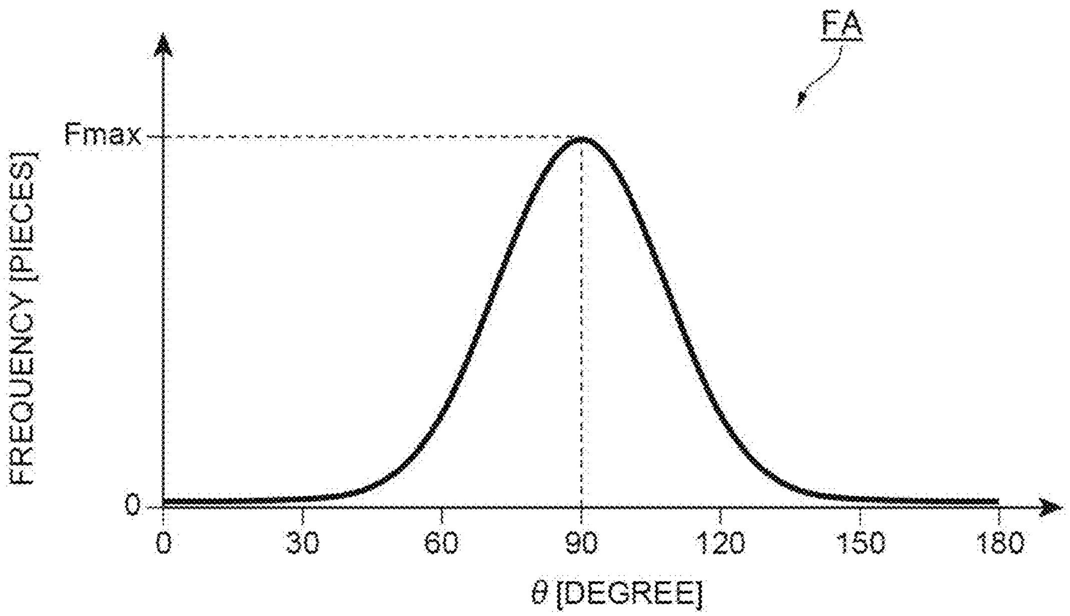
FIG. 4A and FIG. 4B are specific examples of a frequency distribution of the plurality of voids 8 in a cross-section 2*cs* parallel to the easy magnetization axis direction.
Figure 4B:
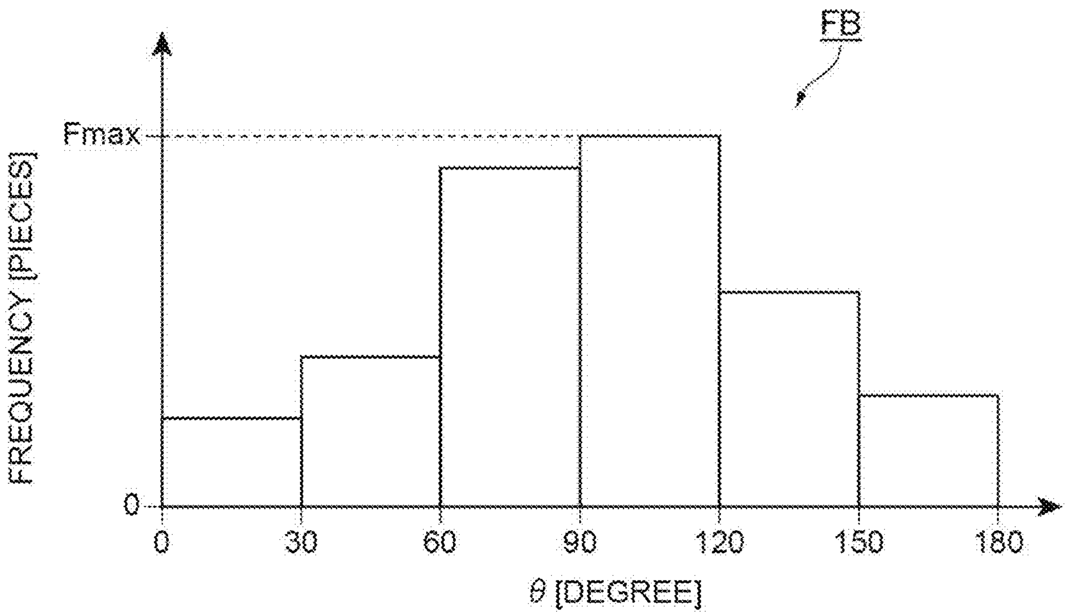

A horizontal axis of a frequency distribution of the plurality of voids 8 in the cross-section 2*cs* that is approximately parallel to the easy magnetization axis direction C represents the θ. A range of the horizontal axis of the frequency distribution is from 0° to 180°. A vertical axis of the frequency distribution represents a frequency of the voids 8. For example, the frequency distribution may be expressed by a frequency distribution curve FA illustrated in FIG. 4A. The frequency distribution may be expressed by a histogram FB illustrated in FIG. 4B.

The frequency distribution of the plurality of voids 8 in the cross-section 2*cs* that is approximately parallel to the easy magnetization axis direction C is maximum in a range of θ of from 60° to 120°. In other words, the maximum value Fmax of the frequency distribution of the plurality of voids 8 in the cross-section 2*cs* that is approximately parallel to the easy magnetization axis direction C is present in a range of θ of from 60° to 120°. In other words, in the cross-section 2*cs* that is approximately parallel to the easy magnetization axis direction C, an angle $\theta_{Fmax}$ of the void 8 at which the frequency is maximum is from 60° to 120°. In other words, in the cross-section 2*cs* that is approximately parallel to the easy magnetization axis direction C, the void 8 having the maximum frequency is the C axis extending void.

The frequency distribution of the plurality of voids 8 in a surface portion 2S (described later) belonging in the cross-section 2*cs* may be maximum in a range of θ of from 60° to 120°.

The frequency distribution of the plurality of voids 8 in a central portion 2C (described later) belonging in the cross-section 2*cs* may be maximum in a range of θ of from 60° to 120°.

As described above, the eddy current I generated in the permanent magnet 2 constituting the rotor of the motor flows in a direction (AB direction) that is approximately orthogonal to the easy magnetization axis direction C. A path of the eddy current I flowing in the AB direction is composed of a plurality of main phase grains 4 which are in contact with each other in the AB direction. However, in accordance with formation of the C axis extending void 8, a plurality of main phase grains 4 adjacent to each other in the AB direction are likely to be spaced apart from each other. That is, the path of the eddy current I formed in the AB direction is likely to be discontinued due to the C axis extending void 8. Accordingly, in a case where the angle θ of the void 8 at which the frequency is maximum is from 60° to 120°, the electric resistivity of the permanent magnet 2 in the direction (AB direction) that is approximately orthogonal to the easy magnetization axis direction C effectively increases due to the relatively large number of the C axis extending voids 8.

Even though the AB axis extending voids are formed in the cross-section 2*cs*, the plurality of main phase grains 4 adjacent to each other in the AB direction are less likely to be spaced apart from each other. That is, the path of the eddy current I formed in the AB direction is less likely to be discontinued by the AB axis extending voids. Accordingly, the void 8 having the maximum frequency in the cross-section 2*cs* that is approximately parallel to the easy magnetization axis direction C is the AB axis extending void, the electric resistivity of the permanent magnet 2 in the AB direction is less likely to increase. That is, in a case where the angle θ of the void 8 having the maximum frequency is 0° or more and less than 60°, or more than 120° and 180° or less, the electric resistivity of the permanent magnet 2 in the AB direction is less likely to increase.

An area of the cross-section 2*cs* that is approximately parallel to the easy magnetization axis direction C may be expressed as Acs. A total number of the voids 8 (C axis extending voids) having θ of from 60° to 120° may be expressed as N. N/Acs may be from 50 pieces/(mm)$^2$ to 3000 pieces/(mm)$^2$, or from 210.9 pieces/(mm)$^2$ to 742.2 pieces/(mm)$^2$. In a case where N/Acs is within the above-described range, the electric resistivity of the permanent magnet 2 in the direction (AB direction) that is approximately orthogonal to the easy magnetization axis direction C is likely to increase. N/Acs may be referred to as the number of the C axis extending voids per unit area of the cross-section 2*cs* that is approximately parallel to the easy magnetization axis direction C.

A sum of the area of the voids 8 (C axis extending voids) in having θ of from 60° to 120° may be expressed as $A_{60\text{-}120}$, and $A_{60\text{-}120}$/Acs may be from 0.2% to 5.0%, or from 0.62% to 2.44%. In a case where $A_{60\text{-}120}$/Acs is within the above-described range, the electric resistivity of the permanent magnet 2 in the direction (AB direction) that is approximately orthogonal to the easy magnetization axis direction C is likely to increase.

For example, an area of each of the voids 8 may be from 5 (μm)$^2$ to 5000 (μm)$^2$.

An area ratio AR of the plurality of voids 8 in the cross-section 2*cs* that is approximately parallel to the easy magnetization axis direction C is from 1% to 5%. The area ratio AR may be expressed as Av/Acs (unit: %). Av may be a sum of areas (opening areas) of the entirety of the voids 8 measured in the cross-section 2*cs* that is approximately parallel to the easy magnetization axis direction C. Acs may be an area of the cross-section 2*cs* (a cross-section where AV is measured) that is approximately parallel to the easy magnetization axis direction C.

As described above, the voids 8 raise the electric resistivity of the permanent magnet 2. Accordingly, the electric resistivity increases in accordance with an increase in the area ratio AR of the plurality of voids 8 in the cross-section 2*cs*. In a case where the area ratio AR of the plurality of voids 8 is 1% or more, the electric resistivity of the permanent magnet 2 in the direction (AB direction) that is approximately orthogonal to the easy magnetization axis direction C is likely to increase. However, even when the area ratio AR is 1% or more, a permanent magnet in which the angle θ of the void 8 in which the frequency is maximum is less than 60° and more than 120° is less likely to have a high electric resistivity in the AB direction.

The cause of a decrease in coercivity of the permanent magnet 2 is a reverse magnetic domain generated in the permanent magnet 2. In accordance with application of a reverse magnetic field to the permanent magnet 2, the reverse magnetic domain becomes a nucleus of magnetization reversal, and a magnetic domain wall propagates to the entirety of the permanent magnet 2 from the reverse magnetic domain. In accordance with propagation of the magnetic domain wall, magnetization of each of the main phase grains 4 in the permanent magnet 2 is reversed. The magnetization reversal of each of the main phase grains 4 is suppressed by pinning of the magnetic domain wall at a pinning site such as a grain boundary.

The larger a difference in an intensity of an anisotropic magnetic field between the pinning site and the main phase grains 4 is, the more a movement of the magnetic domain wall is likely to be suppressed due to pinning of the magnetic domain wall. However, a grain boundary phase in a hot deformed magnet in the related art does not sufficiently function as the pinning site. For example, the hot deformed magnet in the related art contains an R-rich phase, in which a concentration of a rare-earth element R (Nd or the like) is higher in comparison to a main phase grain, as a grain boundary phase (sub-phase). A composition of the R-rich phase is close to $Nd_{30}Fe_7$, and the R-rich phase is a ferromagnetic substance and is also a soft magnetic substance. Accordingly, the difference in the intensity of the anisotropic magnetic field between the R-rich phase and the main phase grains 4 is small, and the R-rich phase does not sufficiently function as the pinning site.

The present inventor found that a coercivity of the hot deformed magnet increases by intentionally forming the plurality of voids 8 as the pinning site in the hot deformed magnet. An intensity of the anisotropic magnetic field in the voids 8 is substantially zero, a difference in the intensity of the anisotropic magnetic field between the voids 8 and the main phase grains 4 is large, and the movement of the magnetic domain wall is effectively suppressed due to pinning of the magnetic domain wall at the voids 8.

In a case where the area ratio AR of the plurality of voids 8 is 1% or more, the movement of the magnetic domain wall is sufficiently suppressed due to pinning of the magnetic domain wall at the voids 8, and the permanent magnet 2 can have a sufficiently high coercivity. However, in accordance with formation of the plurality of voids 8 in the permanent magnet 2, a volume ratio of the plurality of main phase grains 4 in the permanent magnet 2 relatively decreases, and orientation of each of the main phase grains 4 in the easy magnetization axis direction C is likely to be impaired. As a result, the residual magnetic flux density of the permanent magnet 2 is likely to decrease. In a case where the area ratio AR of the plurality of voids 8 is 5% or less, a decrease in the residual magnetic flux density according to formation of the voids 8 is sufficiently suppressed. That is, in a case where the area ratio AR of the plurality of voids 8 is from 1% to 5%, the high coercivity and the high residual magnetic flux density are likely to be compatible with each other. From the same reason, the area ratio AR of the plurality of voids 8 may be from 1.30% to 4.91%. Even in a case where the grain boundary phases (R-rich phases or the like) functioning as pinning sites are few, according to this embodiment, the high coercivity and the high residual magnetic flux density are compatible with each other. Even in a case where the permanent magnet 2 does not contain the heavy rare-earth elements (both of Dy and Tb), according to this embodiment, the high coercivity and the high residual magnetic flux density are compatible with each other.

For example, an electric resistivity (ρ) of the permanent magnet 2 in a direction orthogonal to the easy magnetization axis direction C may be from 1.70 μΩ·cm to 2.50 μΩ·cm, or from 1.78 μΩ·cm to 2.29 μΩ·cm.

For example, a coercivity ($HcJ_{23}$) of the permanent magnet 2 at 23° C. may be from 800 kA/m to 3000 kA/m, or from 800 kA/m to 1113 kA/m.

For example, a coercivity ($HcJ_{150}$) of the permanent magnet 2 at 150° C. may be from 300 kA/m to 1500 kA/m, or from 303 kA/m to 473 kA/m.

For example, a temperature coefficient β of the coercivity may be from −0.50%/° C. to −0.35%/° C., or from −0.50%/° C. to −0.45%/° C. The temperature coefficient β is defined by the following Mathematical Formula 1. $HcJ_{150}$ in the following Mathematical Formula 1 is a coercivity at 150° C. $HcJ_{23}$ in the following Mathematical Formula 1 is a coercivity at 23° C.

$$\beta=100\times(HcJ_{150}-HcJ_{23})/HcJ_{23}(150-23) \quad (1)$$

For example, a residual magnetic flux density (Br) of the permanent magnet 2 at room temperature may be from 1245 mT to 1500 mT, or from 1248 mT to 1278 mT.

For example, a squareness ratio (Hk/HcJ) of the permanent magnet 2 may be from 94.0% to 100%, or from 94.0% to 99.5%. Hk is an intensity of a demagnetizing field corresponding to 90% of the residual magnetic flux density in a second quadrant of a magnetization curve.

The frequency distribution of the plurality of voids 8, N/Acs, $A_{60-120}$/Acs, the area of each of the voids 8, and the area ratio AR may be measured at a part (for example, a region II illustrated in FIG. 1B and FIG. 2) of the cross-section **2*cs* that is approximately parallel to the easy magnetization axis direction C. For example, dimensions of the part of the cross-section 2*cs* in which the measurement is performed may be 300 μm (vertical)×426 μm (horizontal). The cross-section 2*cs* that is approximately parallel to the easy magnetization axis direction C is observed by a scanning electron microscope (SEM), and the frequency distribution is made on the basis of all of the voids 8** included in one observed field of view.

As illustrated in FIG. 2, in the cross-section **2*cs* that is approximately parallel to the easy magnetization axis direction C of the permanent magnet 2, a plurality of flat main phase grains 4 may be observed. In other words, each of the main phase grains 4 observed on the cross-section 2*cs* may have a plate shape. The plurality of flat main phase grains 4 may be stacked along the easy magnetization axis direction C. The permanent magnet 2 may further contain a secondary grain composed of the plurality of main phase grains 4 bounded to each other. The permanent magnet 2 may contain a plurality of secondary grains. At least a part of the voids 8** may be located at a grain boundary between the plurality of secondary grains.

Each of the main phase grains 4 includes at least R (Nd or the like), T, and B. Each of the main phase grains 4 may also be referred to as one crystal grain (that is, a primary grain). Each of the main phase grains 4 contains a crystal (a single crystal or a polycrystal) of $R_2T_{14}B$. $R_2T_{14}B$ is a ferromagnetic ternary intermetallic compound. The main phase grain 4 may consist of only the crystal of $R_2T_{14}B$. The crystal of the $R_2T_{14}B$ may be tetragonal. That is, crystal axes of $R_2T_{14}B$ are an a-axis, a b-axis, and a c-axis, the a-axis, the b-axis, and the c-axis are orthogonal to each other, a lattice constant of $R_2T_{14}B$ in an a-axis direction may be equal to a lattice constant of $R_2T_{14}B$ in a b-axis direction, and a lattice constant of $R_2T_{14}B$ in a c-axis direction may be different from the lattice constants in the a-axis direction and the b-axis direction. The a-axis direction of $R_2T_{14}B$ may be approximately parallel to the AB direction of the permanent magnet 2. The b-axis direction of $R_2T_{14}B$ may be approximately parallel to the AB direction of the permanent magnet 2. The c-axis direction of $R_2T_{14}B$ may be approximately parallel to the easy magnetization axis direction C of the permanent magnet 2.

The main phase grain 4 may include another element in addition to R, T, and B. For example, $R_2T_{14}B$ constituting the main phase grain 4 may be expressed as $(Nd_{1-x}Pr_x)^2(Fe_{1-y}Co_y)_{14}B$. x may be 0 or more and less than 1. y may be 0 or more and less than 1. The main phase grain 4 may include a heavy rare-earth element such as Tb and Dy as R in addition to a light rare-earth element. A part of B in $R_2T_{14}B$ may be substituted with another element such as carbon (C). A composition within the main phase grain 4 may be uniform. The composition within the main phase grain 4 may be non-uniform. For example, a concentration distribution of each of R, T, and B in the main phase grain 4 may have a gradient.

The main phase grain 4 may be composed of a surface layer portion and a central portion covered with the surface layer portion. The surface layer portion may be referred to as a shell, and the central portion may be referred to as a core. The surface layer portion of the main phase grain 4 may include at least one kind of heavy rare-earth element between Tb and Dy. The surface layer portions of all of the main phase grains 4 may include at least one kind of heavy rare-earth element between Tb and Dy. The surface layer portion of a part of all of the main phase grains 4 may include at least one kind of heavy rare-earth element between Tb and Dy. When the surface layer portion includes the heavy rare-earth element, an anisotropic magnetic field is likely to locally increase in the vicinity of a grain boundary, and a magnetization reversal nucleus is less likely to be generated in the vicinity of the grain boundary. As a result, the coercivity of the permanent magnet 2 at a high temperature (for example, 100° C. to 200° C.) increases. As the residual magnetic flux density (Br) and the coercivity of the permanent magnet 2 are likely to be compatible with each other, a sum of concentrations of heavy rare-earth elements in the surface layer portion may be higher than a sum of concentrations of heavy rare-earth elements in the central portion.

A volume ratio of main phases (a volume ratio of all main phase grains 4 in the permanent magnet 2) is not particularly limited. For example, the volume ratio of the main phases may be from 80 volume % to 99 volume %, from 90 volume % to 99 volume %, from 95 volume % to 99 volume %, or from 95.09 volume % to 98.7 volume %. The residual magnetic flux density of the permanent magnet 2 increases in accordance with an increase in the volume ratio of the main phases.

The permanent magnet 2 may further contain a plurality of R-rich phases as a sub-phase. Each of the R-rich phases may be located between the plurality of main phase grains 4. That is, the R-rich phase may be one kind of grain boundary phase contained in a grain boundary of the plurality of main phase grains 4. The grain boundary containing the R-rich phase may be a grain boundary multiple junction surrounded by three or more pieces of the main phase grains 4. The grain boundary containing the R-rich phase may be a two-grain boundary between two pieces of the main phase grains 4. The R-rich phase may be a ferromagnetic substance or a soft magnetic substance. The R-rich phase includes at least R. For example, the R-rich phase may include Nd as R. The R-rich phase 6 may further include one or more kinds of other rare-earth elements as R in addition to Nd. The R-rich phase may further include one or more kinds of elements other than R in addition to R. The R-rich phase may include at least one kind of component selected from the group consisting of a metal, an alloy, an intermetallic compound, and an oxide. For example, a part or all of the R-rich phases may consist only of at least one kind of component among a simple substance of R, an R-containing alloy, and an R-containing intermetallic compound. A part or all of the R-rich phases may include an R-oxide. For example, the R-oxide may be an Nd-oxide. An oxidized surface of the main phase grain 4 may be the R-oxide. A part of the R-rich phases may consist only of the R-oxide.

A concentration of R in the R-rich phases may be higher than an average value of a concentration of R in the main phase grains 4. The concentration of R in the R-rich phases may be higher than an average value of the concentration of R in the cross-section 2_cs_. In a case where the permanent magnet 2 includes a plurality of kinds of R, the concentration of R may be a sum of concentrations of the plurality of kinds of R.

An average value of a length of a short axis of the main phase grains 4 (primary grains) observed in the cross-section 2_cs_ may be from 20 nm to 200 nm. In a case where the average value of the length of the short axis of the main phase grains 4 is within the above-described range, anisotropic growth of each of the main phase grains 4 (crystals of $R_2T_{14}B$) becomes sufficient, and thus each of the main phase grains 4 is likely to be oriented in the easy magnetization axis direction C, and the coercivity, the residual magnetic flux density, and the squareness ratio are likely to increase. An average value of a length of a long axis of the main phase grains 4 (primary grains) observed on the cross-section 2_cs_ may be, for example, from 100 nm to 1000 nm.

The short axis of each of the main phase grains 4 observed in the cross-section 2_cs_ may be approximately parallel to the easy magnetization axis direction C. The long axis of the main phase grains 4 may be approximately orthogonal to the easy magnetization axis direction C. A shape of the main phase grain 4 in the cross-section 2_cs_ is not limited to a rectangular shape. The shape of the main phase grain 4 in the cross-section 2_cs_ may be distorted. The shapes of the main phase grains 4 in the cross-section 2_cs_ do not have to be similar to each other. In a case where the shape of the main phase grain 4 in the cross-section 2_cs_ is distorted, the shape of the main phase grain 4 may be approximated by a quadrangle having the smallest area among quadrangles circumscribing the main phase grain 4. The quadrangle may be a rectangle. A length of a short side of the quadrangle may be regarded as the length of the short axis of the main phase grain 4, and a length of a long side of the quadrangle may be regarded as the length of the long axis of the main phase grain 4. An average value of the length of the short axis of the main phase grains 4 may be calculated from measurement values of the lengths of the short axes of all of main phase grains 4 existing within a backscattered electron image of the cross-section 2_cs_ taken by a scanning electron microscope (SEM). The average value of the length of the long axis of the main phase grains 4 may also be calculated from measurement values of the lengths of the long axes of all of main phase grains 4 existing within the backscattered electron image. However, dimensions of the main phase grains 4 protruding from the backscattered electron image are excluded from calculation of the average values. For example, the maximum value of dimensions of the backscattered electron image used for the measurement of the length of each of the short axis and the long axis of the main phase grain 4 may be, for example, 120 μm (vertical)×80 μm (horizontal), or 80 μm (vertical)×120 μm (horizontal). A plurality of representative sites within the backscattered electron image taken at a low magnification are selected, and a backscattered electron image of each of the sites may be taken at a high magnification. In addition, the average value of each of the long axis and the short axis may be calculated from length of each of the long axis and the short axis of all of main phase grains 4 measured within the backscattered electron image at the high-magnification. Commercially available image analysis software may be used for specifying of a shape (contour line) of the main phase grain 4 and measurement of dimensions of the main phase grain 4 (a quadrangle circumscribing the main phase grain 4).

A width (dimension) of the permanent magnet 2 in the easy magnetization axis direction C may be, for example, from several mm to several hundreds of mm, or from several tens of mm to several hundreds of mm. A dimension of the permanent magnet 2 in the AB direction may be, for example, from several mm to several hundred of mm, or from several tens of mm to several hundreds of mm.

A grain boundary phase other than the R-rich phase may be contained in the grain boundary. For example, the grain boundary may contain a grain boundary phase containing an element introduced into the permanent magnet 2 by a grain boundary diffusion step to be described later. The element introduced into the permanent magnet 2 by the grain boundary diffusion step may be at least one kind of heavy rare-earth element between Tb and Dy. The element that is introduced into the permanent magnet 2 by the grain boundary diffusion step may be a heavy rare-earth element and a light rare-earth element, and the light rare-earth element may be at least one between Nd and Pr. The element introduced into the permanent magnet 2 by the grain boundary diffusion step may be a heavy rare-earth element, a light rare-earth element, and copper.

A width of the permanent magnet 2 in the easy magnetization axis direction C is expressed as t. A surface portion 2S of the permanent magnet 2 is defined as a portion where a depth from a surface of the permanent magnet 2 in the easy magnetization axis direction C is from 0 to 0.25t. An area ratio of the plurality of voids 8 in the surface portion 2S is expressed as ARs %. The ARs is measured in the surface portion 2S exposed on the cross-section 2*cs*. A central portion 2C of the permanent magnet 2 is defined as a portion where the depth from the surface of the permanent magnet 2 in the easy magnetization axis direction C is more than 0.25t and 0.5t or less. The central portion 2C may be a portion where the depth from the surface of the permanent magnet 2 in the easy magnetization axis direction C is more than 0.25t and less than 0.75t. An area ratio of the plurality of voids 8 in the central portion 2C is expressed as ARc %. The ARc is measured in the central portion 2C exposed on the cross-section 2*cs*. ARs may be higher than ARc. As to be described later, an eddy current of the surface portion 2S tends to be larger than an eddy current of the central portion 2C. Accordingly, as ARs is larger than ARc, an electric resistivity of the surface portion 2S is higher than an electric resistivity of the central portion 2C, and an eddy current loss in the permanent magnet 2 is more likely to be reduced. For the same reason, ARs-ARc may be from 1.0% to 4.0%, or from 1.5% to 4.0%. Each of ARs and ARc may be from 1% to 5%.

A permanent magnet synchronous motor (PMSM) such as an IPM motor and an SPM motor is one kind of an alternating-current synchronous motor (ACSM). The alternating-current synchronous motor is driven by a rotary magnetic field generated by an AC current. In an electric vehicle, a hybrid vehicle, or the like, driving of the alternating-current synchronous motor in a wide rotation range is required. The rotation speed of the alternating-current synchronous motor is proportional to a frequency of the AC current, and thus a wide frequency range of AC current is required for driving of the alternating-current synchronous motor in a wide rotation range. The wide frequency range of AC current can be generated by an inverter.

For example, the frequency range of a fundamental wave of an inverter for the alternating-current synchronous motor mounted on an automobile is approximately from 100 Hz to 1500 Hz. On the other hand, the inverter typically outputs a pseudo sinusoidal wave by pulse width modulation (PWM) control. At this time, a carrier frequency is approximately 20 kHz.

The above-described AC current is one factor of a penetration depth of the eddy current generated in the permanent magnet 2. Typically, the penetration depth is a depth from a metal surface at which the eddy current is (1/e) times (approximately 36.8% of) the eddy current on the metal surface. e is a Napier number. For example, the penetration depth δ is expressed by the following Mathematical Formula 2.

$$\delta=[\rho/(\pi f\mu)]^{1/2} \qquad (2)$$

ρ in Mathematical Formula 2 represents an electric resistivity of a metal (unit: $\times10^{-8}$ Ω·m). f in Mathematical Formula 2 represents a frequency of an AC current. μ represents a permeability (unit: H/m) of the metal. On the basis of an electric resistivity and a permeability of a typical R-T-B based permanent magnet, and a carrier frequency (20 kHz) of an inverter, the penetration depth of the permanent magnet 2, which is calculated from Mathematical Formula 2, is approximately 1 mm. That is, the eddy current exponentially decreases in accordance with an increase in the depth from the surface of the permanent magnet. In other words, the eddy current in the surface portion 2S of the permanent magnet 2 is significantly larger than the eddy current in the central portion 2C of the permanent magnet 2. Accordingly, as a larger number of voids exist in a portion where the depth from the surface of the permanent magnet 2 is relatively small (that is, as ARs is larger), the electric resistivity of the surface portion 2S is high, and the eddy current loss in the permanent magnet 2 is more likely to be reduced.

On the other hand, the eddy current in the central portion 2C of the permanent magnet 2 is significantly smaller than the eddy current in the surface portion 2S of the permanent magnet 2. Accordingly, voids 8 formed in the central portion 2C are less likely to contribute to a reduction of the eddy current loss in comparison to voids 8 formed in the surface portion 2S. That is, ARc is less likely to contribute the reduction of the eddy current in comparison to ARs. Rather, as a larger number of voids 8 exist in the central portion 2C (that is, as ARc is larger), a volume ratio of the main phase grains 4 in the central portion 2C is likely to relatively decrease. As a result, magnetic characteristics such as the residual magnetic flux density is impaired. Accordingly, ARc is preferably smaller than ARs for improving the magnetic characteristics.

From the above-described reasons, in a case where ARs is larger than ARc, suppression of the eddy current in the surface portion 2S and excellent magnetic characteristics in the central portion 2C are likely to be compatible with each other.

Each of the main phase grains 4, the voids 8, and the grain boundary phases can be identified on the basis of contrast of an image of the cross-section 2*cs* of the permanent magnet 2 taken by scanning electron microscope (SEM) or scanning transmission electron microscope (STEM). A composition of each of the main phase grains 4 and the grain boundary phases may be analyzed by an electron beam probe micro analyzer (EPMA) equipped with an energy dispersive X-ray spectroscopy (EDS) device.

A composition of the entirety of the permanent magnet 2 will be described below. However, the composition of the permanent magnet 2 is not limited to the following composition. A content of each element in the permanent magnet 2 may be out of the following range.

A content of R in the R-T-B based permanent magnet may be from 28.00 mass % to 33.00 mass %. When the content of R is within the above-described range, the residual magnetic flux density and the coercivity of the permanent magnet 2 are likely to increase. In a case where the content of R is 28.00 mass % or more, it is easy to suppress cracks formed in the permanent magnet 2 in a hot plastic deforming step. In a case where the content of R is 28.00 mass % or more, $R_2T_{14}B$ constituting the main phase grain 4 is likely to be formed, and an x-Fe phase having soft magnetism is less likely to be formed. As a result, the coercivity is likely to increase. On the other hand, in a case where the content of R is 33.00 mass % or less, segregation of a liquid phase (R-rich phase) on a surface of the permanent magnet 2 is suppressed in the hot plastic deforming step, and seizure of a mold and the permanent magnet 2 is suppressed. In a case where the content of R is 33.00 mass % or less, formation of the R-rich phases 6 is appropriately suppressed, and the residual magnetic flux density is likely to increase. From the viewpoint that the residual magnetic flux density and the coercivity are likely to increase, a sum of ratios of Nd and Pr in all rare-earth elements R may be from 80 atomic % to 100 atomic %, or from 95 atomic % to 100 atomic %.

A total content of Tb and Dy in the permanent magnet 2 may be from 0.00 mass % to 5.00 mass %. When the permanent magnet 2 includes at least one kind of heavy rare-earth element between Tb and Dy, magnetic characteristics (particularly, a coercivity at a high temperature) of the permanent magnet 2 are likely to increase. However, the permanent magnet 2 does not have to include Tb and Dy.

A content of B in the R-T-B based permanent magnet may be from 0.8 mass % to 1.1 mass %. In a case where the content of B is 0.8 mass % or more, formation of a heterogeneous phase such as an $R_2Fe_{17}$ phase is suppressed, and the coercivity and the residual magnetic flux density are likely to increase. In a case where the content of B is 1.1 mass % or less, formation of a heterogeneous phase such as $R_{1+\varepsilon}Fe_4B_4$ (boride) is suppressed, and the coercivity and the residual magnetic flux density are likely to increase. In a case where the content of B is within the above-described range, the squareness ratio of the permanent magnet 2 is likely to be close to 1.0.

In a case where a sum of contents of the rare-earth elements R in the permanent magnet 2 is from 28.00 mass % to 33.00 mass %, and a content of B in the permanent magnet 2 is from 0.8 mass % to 1.1 mass %, the sum of contents of the rare-earth elements R in the permanent magnet 2 is more than a chemical stoichiometric ratio of $R_2T_{14}B$. As a result, a liquid phase is likely to be generated in a grain boundary in the hot plastic deforming step to be described later. The liquid phase in the grain boundary promotes anisotropic growth of a crystal grain ($R_2T_{14}B$), grain boundary sliding, and rotation of the crystal grain. As a result, a c-axis of the crystal grain is likely to be oriented in a stress direction, a ratio of crystal grains aligned in the easy magnetization axis direction among all crystal grains in the permanent magnet 2 is likely to increase, and the residual magnetic flux density of the permanent magnet 2 is likely to increase.

The permanent magnet 2 may include gallium (Ga). A content of Ga may be from 0.03 mass % to 1.00 mass %, or from 0.20 mass % to 0.80 mass %. In a case where the content of Ga is within the above-described range, generation of a sub-phase (for example, phases including R, T, and Ga) is appropriately suppressed, and the residual magnetic flux density and the coercivity of the permanent magnet 2 are likely to increase. However, the permanent magnet 2 does not have to include Ga.

The permanent magnet 2 may include aluminum (Al). A content of Al in the permanent magnet 2 may be from 0.01 mass % to 0.2 mass %, or from 0.04 mass % to 0.07 mass %. When the content of Al is within the above-described range, the coercivity and corrosion resistance of the permanent magnet are likely to be improved. However, the permanent magnet 2 does not have to include Al.

The permanent magnet 2 may include copper (Cu). A content of Cu in the permanent magnet 2 may be from 0.01 mass % to 1.50 mass %, or from 0.04 mass % to 0.50 mass %. When the content of Cu is within the above-described range, the coercivity, the corrosion resistance, and temperature characteristics of the permanent magnet 2 are likely to be improved. However, the permanent magnet 2 does not have to include Cu.

The permanent magnet 2 may include cobalt (Co). A content of Co in the permanent magnet may be from 0.30 mass % to 6.00 mass %, or from 0.30 mass % to 4.00 mass %. When the permanent magnet 2 includes Co, a Curie temperature of the permanent magnet 2 is likely to be heightened. In addition, when the permanent magnet 2 includes Co, the corrosion resistance of the permanent magnet 2 is likely to be improved. However, the permanent magnet 2 does not have to include Co.

A balance excluding the above-described elements from the permanent magnet 2 may be only Fe, or Fe and other elements. A sum of contents of elements other than Fe in the balance may be 5 mass % or less with respect to the total mass of the permanent magnet 2 so that the permanent magnet 2 has sufficient magnetic characteristics.

The permanent magnet 2 may include at least one kind selected from the group consisting of silicon (Si), titanium (Ti), manganese (Mn), zirconium (Zr), vanadium (V), chromium (Cr), nickel (Ni), niobium (Nb), molybdenum (Mo), hafnium (Hf), tantalum (Ta), tungsten (W), bismuth (Bi), tin (Sn), calcium (Ca), carbon (C), nitrogen (N), oxygen (O), chlorine (Cl), sulfur(S), and fluorine (F) as the other elements (for example, inevitable impurities). A sum of contents of the other elements in the permanent magnet 2 may be from 0.001 mass % to 0.50 mass %.

A composition of the entirety of the permanent magnet 2 may be analyzed, for example, by an X-ray fluorescence (XRF) analysis method, a high-frequency inductively coupled plasma (ICP) emission analysis method, an inert gas fusion-non-dispersive infrared absorption (NDIR) method, a combustion in an oxygen stream-infrared absorption method, an inert gas fusion-thermal conductivity method, and the like.

The permanent magnet 2 may be applied to a motor, a generator, an actuator, or the like. For example, the permanent magnet 2 is used in various fields such as a hybrid vehicle, an electric vehicle, a hard disk drive, a magnetic resonance imaging (MRI) device, a smartphone, a digital camera, a slim-type TV, a scanner, an air conditioner, a heat pump, a refrigerator, a cleaner, a washing and drying machine, an elevator, and a wind power generator.

(Method of Producing Permanent Magnet)

A method of producing a permanent magnet according to this embodiment includes at least a ribbon preparation step, a hot pressing step, and a hot plastic deforming step. The method of producing the permanent magnet may further include another step such as a grain boundary diffusion step subsequent to the hot plastic deforming step. However, the grain boundary diffusion step is not essential.

The method of producing the permanent magnet may be executed under a non-oxidizing atmosphere to prevent the permanent magnet and its work-in progress from oxidation during the producing process. For example, the non-oxidizing atmosphere may be an inert gas such as an argon (Ar) gas. The non-oxidizing atmosphere may further contain a reducing gas such as a hydrogen gas ($H_2$) in addition to the inert gas.

The ribbon preparation step is a step of preparing alloy ribbons from a raw material metal by a rapid-solidification method. In the rapid-solidification method, a molten metal in a crucible is ejected to a surface of a cooled roll from a nozzle located at a tip end of the crucible. The molten metal comes into contact with the surface of the cooled roll, and the molten metal is instantly flicked by the cooled roll rotating at a high speed, then becomes a plurality of elongated ribbon patterns. Due to contact with the surface of the cooled roll, the molten metal is rapidly cooled and solidifies. As a result, the plurality of elongated alloy ribbons are formed. A container is set up in a direction in which the alloy ribbons are flicked by the cooled roll, and the alloy ribbons are collected into the container.

The molten metal is a metal (raw material metals) containing respective elements constituting the permanent magnet. For example, the raw material metal may be a simple substance of a rare-earth element (simple substance of a metal); an alloy including a rare-earth element; pure iron; ferroboron; or an alloy including these materials. The raw material metals are weighed to match a desired composition of the permanent magnet.

The molten metal may be obtained by heating the raw material metals inside a crucible by high-frequency inductive heating. A temperature (ejection temperature) of the molten metal ejected from a nozzle is, for example, approximately 1400° C. A temperature rising rate until the temperature of the raw material metal reaches the ejection temperature is, for example, approximately from 20° C./second to 100° C./second.

The surface of the cooled roll may be composed of a metal such as Cu having high thermal conductivity. A temperature of the surface of the cooled roll may be controlled by a coolant flowing through the inside of the cooled roll. The higher the cooling rate of the molten metal on the surface of the cooled roll is, a grain size of a crystal ($R_2T_{14}B$) contained in the alloy ribbon is likely to be finer, and the coercivity of the permanent magnet is likely to be higher. The smaller the amount of the molten metal ejected to the surface of the cooled roll per unit time is, the molten metal adhered to the surface of the cooled roll becomes thinner, the cooling rate becomes higher, and the alloy ribbon becomes thinner. The higher a peripheral speed of the cooled roll becomes, the molten metal adhered to the surface of the cooled roll becomes thinner, the cooling rate becomes higher, and the alloy ribbon becomes thinner. A thickness of the main phase grain in the easy magnetization axis direction (length of the short axis of the main phase grain) depends on a thickness of the alloy ribbon (and pulverization and classification of the alloy ribbon). The thinner the alloy ribbon is, the thickness (grain size) of the main phase grain becomes smaller, and the coercivity of the permanent magnet tends to be higher. For example, the thickness of the alloy ribbon may be from 20 μm to 60 μm, or from 30 μm to 50 μm. For example, a width of the alloy ribbon may be from 1.0 μm to 5.0 mm.

After the ribbon preparation step, a pulverization/classification step may be carried out. The pulverization/classification step is a step of pulverizing the alloy ribbons by using a pulverization device to prepare a coarse powder, and of classifying the coarse powder to collect an alloy powder having a predetermined particle size and a predetermined aspect ratio. The alloy powder is a precursor of the main phase grains contained in the permanent magnet. A shape of each alloy particle constituting the alloy powder may be a plate shape or a flake shape. For example, a pulverization method of the alloy ribbon may be at least one method between a cutter mill and a propeller mill. A mean for classification of the coarse powder may be a sieve. For example, the particle size and a particle size distribution of the alloy powder obtained through classification may be measured by a laser diffraction scattering method. For example, the particle size of the alloy powder obtained through classification may be from 60 μm to 2800 μm, or from 150 μm to 2800 μm.

The hot pressing step is a step of forming a green compact by heating and pressing the alloy ribbons (alloy powder). For example, the alloy powder may be compressed inside of a mold while heating the alloy powder inside the mold. Due to pressing of the alloy powder, voids between alloy powders are reduced and a dense green compact is obtained. In addition, due to heating of the alloy powder along with the pressing, a liquid phase (R-rich phase such as Nd-rich phase) is formed from a surface of the alloy powder, the voids (grain boundaries) between the alloy powders are filled with the liquid phase, and the alloy powders are lubricated due to the liquid phase, and thus the dense green compact is obtained. A cold pressing step may be carried out before the hot pressing step. In the cold pressing step, a green compact may be formed by pressing the alloy powder at an ordinary temperature (room temperature). The green compact obtained by the cold pressing step may be pressed while being heated in the hot pressing step to densify the green compact. A temperature (hot pressing temperature) of the alloy powder in the hot pressing step may be, for example, from 650° C. to 750° C. In a case where the hot pressing temperature is excessively high, grain growth of the crystal ($R_2T_{14}B$) constituting the alloy powder excessively progresses, and the coercivity of the permanent magnet decreases. A pressure (hot pressing pressure) applied to the alloy powder in the hot pressing step may be from 50 MPa to 200 MPa. A time (hot pressing time) for which the hot pressing temperature and the hot pressing pressure are maintained within the above-described ranges may be, for example, from several tens of seconds to several hundreds of seconds.

After the hot pressing step, the hot plastic deforming step is carried out. The hot plastic deforming step is a step of obtaining a magnet base material containing a plurality of main phase grains (crystal grains of $R_2T_{14}B$), in which the c-axis (easy magnetization axis) is oriented in a predetermined direction, through hot extrusion of the green compact obtained by the hot pressing step. For example, in the hot plastic deforming step, the green compact is extruded from a mold while heating the green compact. In the mold, a grain boundary phase in the heated green compact liquefies and a liquid phase (R-rich phase) is generated, and a stress is applied to the green compact in a predetermined direction, and respective alloy particles constituting the green compact are distorted. In accordance with generation of the liquid phase and distortion of the alloy particles, anisotropic growth of crystal grains in a direction orthogonal to the c-axis of the crystal grains progresses. In addition, the liquid phase lubricates the crystal grains, and thus a force is applied to respective crystal grains in accordance with the stress. As a result, the crystal grains rotate due to grain boundary sliding, and the c-axis of respective crystal grains (main phase grains) is oriented approximately in parallel to a stress direction. In other words, a plurality of flat main phase grains extending in a direction that is approximately orthogonal to the c-axis are stacked along the stress direction.

A temperature (hot plastic deforming temperature) of the green compact in the hot plastic deforming step may be, for example, 700° C. or higher and lower than 900° C., or from 700° C. to 850° C.

In a case where the hot plastic deforming temperature is too low, the liquid phase (the R-rich phase such as the Nd-rich phase) is less likely to be generated at a grain boundary inside the green compact, crystal grains are less likely to be grown, and rotation of crystal grains due to grain boundary sliding is less likely to occur. As a result, an average value of the length of the short axis of the main phase grain is likely to be less than 20 nm, and the c-axis of the main phase grains (crystal grains) is less likely to be oriented in approximately parallel to the stress direction.

In a case where the hot plastic deforming temperature is excessively high (for example, in a case where the hot plastic deforming temperature is 900° C. or higher), the liquid phase (the R-rich phase) excessively exudes from each of the alloy particles and segregates to the surface of each of the alloy particles and an interface between the alloy particles, and most of the liquid phase is consumed for grain growth of crystal grains. When most of the liquid phase is consumed for grain growth of crystal grains, grain growth of the main phase grains (crystal grains) progresses abnormally, and a coarse main phase grain is likely to be formed, and the average value of the length of the short axis of the main phase grains is likely to exceed 200 nm. The coarse main phase grain is less likely to be oriented in the easy magnetization axis direction.

An extrusion rate in the hot extrusion may be from $10^{-2}$ mm/second to 9.9 mm/second. In a case where the extrusion rate is excessively high (for example, in a case where the extrusion rate is 10 mm/second or more), anisotropic growth of the main phase grains (crystal grains) inside the green compact does not progress sufficiently, and thus the average value of the length of the short axis of the main phase grains (primary grains) is likely to be less than 20 nm. That is, in a case where the extrusion rate is excessively high, the green compact is extruded from the mold before the anisotropic growth of the crystal grains inside the green compact progresses sufficiently. As a result, the c-axis of the main phase grains (crystal grains) is less likely to be oriented approximately in parallel to the stress direction.

A pressure (hot plastic deforming pressure) applied to the green compact in the hot plastic deforming step may be from 50 MPa to 200 MPa. For example, a time (hot plastic deforming time) for which the hot plastic deforming temperature and the hot plastic deforming pressure are maintained within the above-described ranges may be several tens of seconds.

The mold used for the hot plastic deforming step has a tubular shape. That is, a cavity formed inside the mold passes through the mold from an end surface (starting end surface) of the mold where an inlet for the green compact is opened toward an end surface (terminal end surface) of the mold where an extrusion port for the green compact is opened. The starting end surface and the terminal end surface are planes parallel to each other. A direction from the starting end surface to the terminal end surface is an extrusion direction of the green compact, and the extrusion direction is orthogonal to the starting end surface and the terminal end surface. An opening area of the extrusion port of the green compact is smaller than an opening area of the inlet of the green compact.

A specific example of the cavity formed inside the mold is illustrated in FIG. 5. The cavity 10 is sectioned into an inlet side region 10A, an intermediate region 10B, and an extrusion port side region 10C along an extrusion direction Z. The inlet side region 10A is opened at the starting end surface. The extrusion port side region 10C is opened at the terminal end surface. The intermediate region 10B is located between the inlet side region 10A and the extrusion port side region 10C in the extrusion direction Z.

An outlet of the intermediate region 10B (that is, a boundary between the intermediate region 10B and the extrusion port side region 10C) is noted as a "first outlet". An outlet of the extrusion port side region 10C (that is, an extrusion port of the green compact at the terminal end surface) is noted as a "second outlet".

A shape of the cavity 10 in a cross-section of the mold that is orthogonal to the extrusion direction Z (cross-section of the mold that is parallel to the starting end surface and the terminal end surface) is a quadrilateral of which four corners are right angles. A pair of sides facing each other in the quadrilateral is noted as a first side, and another pair of sides facing each other in the quadrilateral is noted as a second side.

A length xa of the first side in the inlet side region 10A is constant. A length ya of the second side in the inlet side region 10A is also constant. That is, an opening area of the inlet side region 10A in a cross-section orthogonal to the extrusion direction Z is constant. In the intermediate region 10B, the length xa of the first side gradually decreases along the extrusion direction Z, and finally, the length xa approximately matches the length xc1 of the first side in the first outlet (outlet of the intermediate region 10B). Accordingly, the first side in the extrusion port side region 10C is shorter than the first side in the inlet side region 10A. In addition, in the intermediate region 10B, the length ya of the second side gradually increases along the extrusion direction Z, and finally, the length ya approximately matches the length yc1 of the second side in the first outlet (outlet of the intermediate region 10B). Accordingly, the second side in the extrusion port side region 10C is longer than the second side in the inlet side region 10A. Further, an opening area of the intermediate region 10B in a cross-section orthogonal to the extrusion direction Z gradually decreases along the extrusion direction Z, and finally, the opening area approximately matches an opening area of the extrusion port side region 10C in a cross-section orthogonal to the extrusion direction Z. Accordingly, the opening area of the extrusion port side region 10C in the cross-section orthogonal to the extrusion direction Z is smaller than the opening area of the inlet side region 10A in the cross-section orthogonal to the extrusion direction Z.

A length of the first side in the extrusion port side region 10C is constant. That is, a length xc2 of the first side at the second outlet (outlet of the extrusion port side region 10C) is equal to the length xc1 of the first side at the first outlet (outlet of the intermediate region 10B).

A length of the second side in the extrusion port side region 10C gradually increases along the extrusion direction Z. That is, a length yc2 of the second side at the second outlet (outlet of the extrusion port side region 10C) is slightly larger than the length yc1 of the second side at the first outlet (outlet of the intermediate region 10B).

Since the length of the second side in the extrusion port side region 10C gradually increases along the extrusion direction Z, an opening area of the extrusion port side region 10C in a cross-section orthogonal to the extrusion direction Z also gradually increases along the extrusion direction Z. Accordingly, the opening area of the second outlet (outlet of the extrusion side region 10C) is slightly larger than the opening area of the first outlet (outlet of the intermediate region 10B). However, the opening area of the second outlet (outlet of the extrusion port side region 10C) is smaller than the opening area of the inlet side region 10A in a cross-section orthogonal to the extrusion direction Z.

Figure 6A:
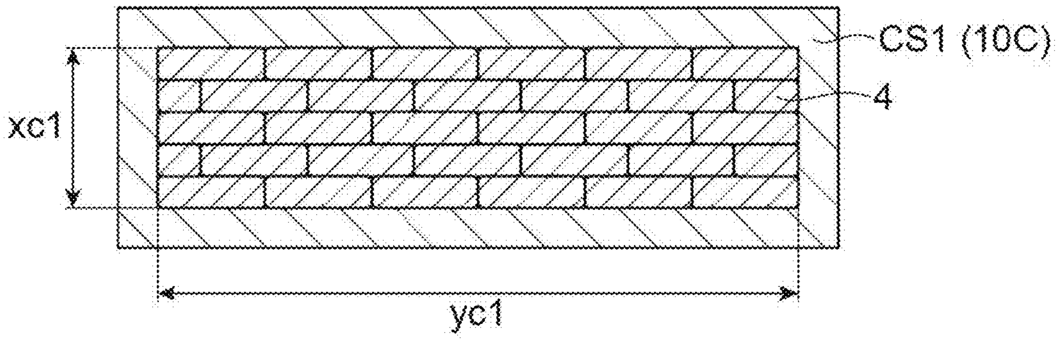
FIG. 6A, FIG. 6B, and FIG. 6C are schematic views illustrating a mechanism in which the plurality of voids 8 are formed in the R-T-B based permanent magnet 2.
Figure 6B:
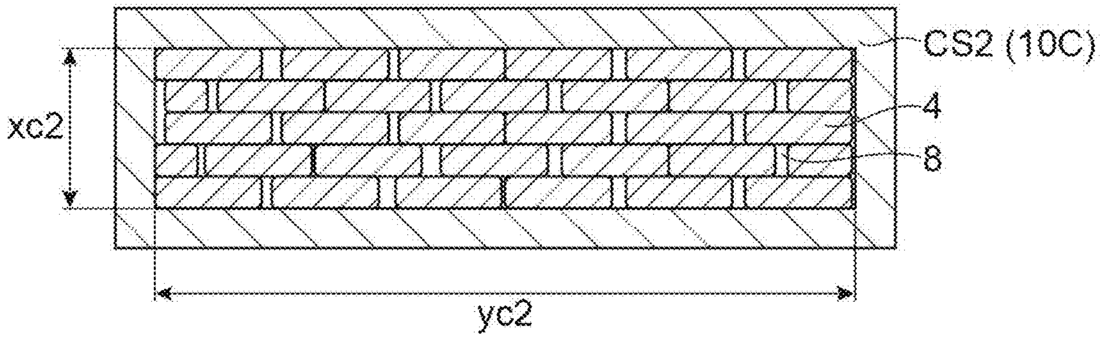

FIG. 6A illustrates a cross-section CS1 of the mold in the above-described first outlet (outlet of the intermediate region 10B). In addition, FIG. 6B illustrates a cross-section CS2 of the mold in the above-described second outlet (outlet of the extrusion port side region 10C). Both the cross-section CS1 and the cross-section CS2 of the mold are orthogonal to the extrusion direction Z.

As described above, the opening area of the extrusion port side region 10C in the cross-section orthogonal to the extrusion direction Z is smaller than the opening area of the inlet side region 10A in the cross-section orthogonal to the extrusion direction Z, and the first side in the extrusion port side region 10C (terminal end surface) is shorter than the second side in the extrusion port side region 10C (terminal end surface). In the intermediate region 10B, the length xa of the first side gradually decreases along the extrusion direction Z, and in the intermediate region 10B, the length ya of the second side gradually increases along the extrusion direction Z. Accordingly, in the intermediate region 10B and the extrusion port side region 10C, a stress that is approximately parallel to the first side acts on the green compact, and grain boundary sliding and rotation of the main phase grain occur. As a result, the c-axis of main phase grain is oriented along a stress direction (direction of the first side). That is, the easy magnetization axis direction C of the green compact (magnet base material obtained by hot extrusion) approximately matches the direction X of the first side in the extrusion port side region 10C (terminal end surface). In other words, the AB direction of the green compact approximately matches the direction Y of the second side in the extrusion port side region 10C (terminal end surface).

A temperature of the extrusion port side region 10C gradually decreases along the extrusion direction Z. That is, a temperature T1 of the first outlet (outlet of the intermediate region 10B) is higher than a temperature T2 of the second outlet (outlet of the extrusion port side region 10C). Accordingly, the temperature of the green compact gradually decreases during movement inside the extrusion port side region 10C. For example, the temperature T1 of the first outlet (outlet of the intermediate region 10B) may be adjusted to from 780° C. to 790° C., and the temperature T2 of the second outlet (outlet of the extrusion port side region 10C) may be adjusted to (T1−30° C.) (that is, from 750° C. to 760° C.).

A coefficient of thermal expansion of the main phase grain (a tetragonal crystal of $Nd_2Fe_{14}B$) in the easy magnetization axis direction C (the c-axis direction) is $6.5\times10^{-6}$ (1/K). On the other hand, a coefficient of thermal expansion of the main phase grain in the AB direction (the a-axis direction and the b-axis direction) is $-1.5\times10^{-6}$ (1/K). Accordingly, in accordance with lowering of the temperature of the green compact within the extrusion port side region 10C, the green compact is likely to be contracted in the easy magnetization axis direction C (the direction X of the first side), and is likely to be expanded in the AB direction (the direction Y of the second side).

By adjusting dimension ratios of the first side and the second side in the extrusion port side region 10C in consideration of contraction of the green compact in the easy magnetization axis direction C (the direction X of the first side) and expansion of the green compact in the AB direction (the direction Y of the second side), disturbance of the orientations of the main phase grains in the green compact in accordance with lowering of the temperature of the green compact is suppressed.

The green compact expands in accordance with a reduction or release of a pressure applied to the green compact. That is, the green compact expands in accordance with spring back.

As described above, the length of the first side in the extrusion port side region 10C is constant. That is, the length xc2 of the first side at the second outlet (outlet of the extrusion port side region 10C) is equal to the length xc1 of the first side at the first outlet (outlet of the intermediate region 10B). Accordingly, a pressure in the easy magnetization axis direction C (direction of the first side) that acts on the green compact in the extrusion port side region 10C is approximately constant. As a result, the green compact in the extrusion port side region 10C is less likely to expand in the easy magnetization axis direction C (the direction X of the first side). In other words, the plurality of main phase grains 4 adjacent to each other in the green compact are less likely to be spaced apart from each other in the easy magnetization axis direction C (direction X of the first side).

On the other hand, the length of the second side in the extrusion port side region 10C gradually increases along the extrusion direction Z. That is, the length yc2 of the second side at the second outlet (outlet of the extrusion port side region 10C) is slightly larger than the length yc1 of the second side at the first outlet (outlet of the intermediate region 10B). Accordingly, a pressure in the AB direction (direction Y of the second side) that acts on the green compact in the extrusion port side region 10C gradually decreases. As a result, the green compact in the extrusion port side region 10C is likely to expand in the AB direction (direction Y of the second side) in accordance with spring back. In accordance with spring back of the green compact in the AB direction (direction Y of the second side), the plurality of main phase grains 4 adjacent to each other in the green compact are likely to be spaced apart from each other in the AB direction (direction Y of the second side). That is, in accordance with spring back of the green compact in the AB direction (direction Y of the second side), the voids 8 (C axis extending voids) extending along the easy magnetization axis direction C are formed between the plurality of main phase grains 4 adjacent to each other (refer to the cross-section CS2 of the mold in FIG. 6B).

yc2/yc1 may be from 30.005/30.00 to 30.04/30.00, or from 30.01/30.00 to 30.03/30.00.

In accordance with an increase of yc2/yc1, the number of the voids 8 and the volume thereof are likely to increase. When yc2/yc1 is adjusted within the above-described range, the angle $\theta_{Fmax}$ at which the frequency of the voids 8 is maximum, N/Acs, $A_{60-120}$/Acs, the area of each of the voids 8, and the area ratio AR are likely to be controlled within the above-described desired ranges.

Figure 6C:
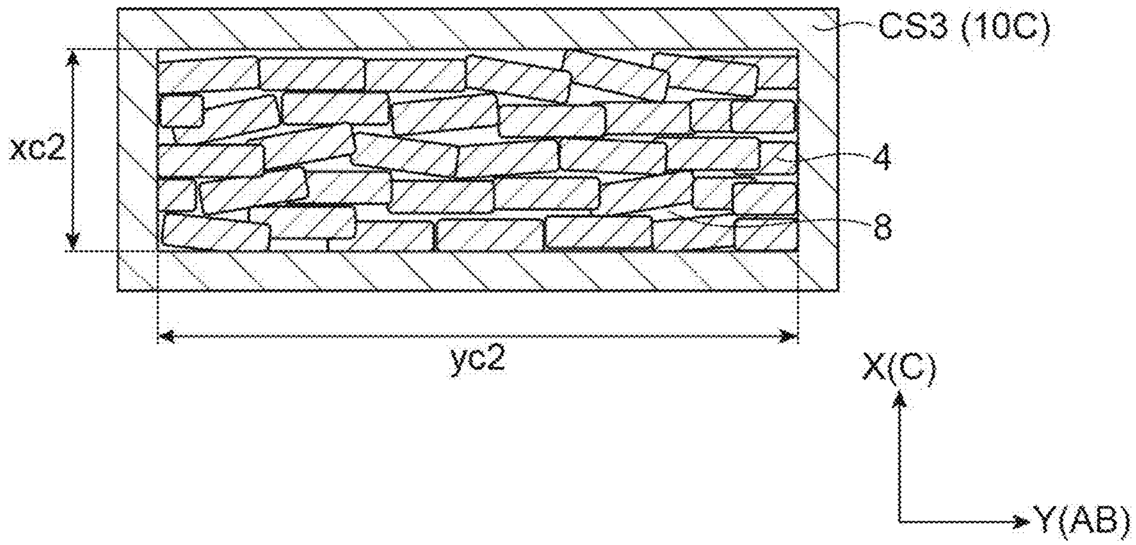

In a case where the length xc2 of the first side at the second outlet is larger than the length xc1 of the first side at the first outlet, and the length yc2 of the second side at the second outlet is the same as the length yc1 of the second side at the first outlet, the voids 8 extending along the easy magnetization axis direction C are less likely to be formed in the green compact. In other words, in a case where a dimension of the extrusion port side region 10C in the easy magnetization axis direction C (direction X of the first side) gradually increase along the extrusion direction Z, and a dimension of the extrusion port side region 10C in the AB direction (direction Y of the first side) are constant, the green compact in the extrusion port side region 10C is likely to expand in the easy magnetization axis direction C (direction X of the first side), and is less likely to expand in the AB direction (direction Y of the second side). As a result, the plurality of main phase grains 4 adjacent to each other in the green compact are likely to be spaced apart from each other in the easy magnetization axis direction C, and the voids 8 (AB axis extending voids) extending along the AB direction are likely to be formed between the plurality of main phase grains 4 adjacent to each other (refer to a cross-section CS3 of the mold in FIG. 6C).

The hot plastic deforming step is carried out to obtain a dense magnet base material (green compact). To obtain a completely dense green compact, a hot plastic deforming at a high temperature and a high pressure is required, and time is also required.

However, the high temperature makes a crystal grain size of the raw material (alloy ribbon) be coarse. Coarsening of the crystal grain size lowers the coercivity, impairs forgeability and the orientations of the crystal grains (main phase grains), and lowers the residual magnetic flux density. The high pressure accelerates mold abrasion and causes lower productivity. When longer time is required for processing, the productivity is lower. Deterioration of the forgeability causes lower productivity.

From the above-described reasons, there is a possibility that complete densification of the green compact may cause deterioration of the magnetic characteristics of the finally obtained permanent magnet and lower productivity. Accordingly, it is not necessary to obtain a completely dense green compact. The degree of densification of the green compact should be determined from the viewpoint of the balance between the magnetic characteristics and the productivity of the permanent magnet.

Typically, the hot pressing step is carried out by uniaxial pressing or biaxial pressing unlike cold isostatic pressing (CIP) or hot isostatic pressing (HIP). In accordance with the uniaxial pressing or the biaxial pressing, a distribution of a stress acting on the magnet base material (green compact) inside the mold occurs. The stress distribution is caused by pressure transfer inside the mold, and the stress becomes low in the vicinity of an inner wall of the mold (that is, a surface of the green compact). As a result, the density of the green compact is likely to be lowered in the surface portion of the green compact that is in contact with the inner wall of the mold. That is, voids are likely to remain in the surface portion of the green compact that is in contact with the inner wall of the mold. The voids remaining in the green compact do not disappear even after the hot plastic deforming step, and are not discharged to the outside of the green compact. That is, the voids remaining in the surface portion of the green compact remain in a surface portion of a finally obtained permanent magnet.

From the above-described reasons, an area ratio ARs of a plurality of voids in the surface portion of the permanent magnet is likely to be higher than an area ratio ARc of a plurality of voids in the central portion of the permanent magnet.

The magnet base material obtained through the above-described steps may be a finished product of the permanent magnet. The magnet base material subjected to the following grain boundary diffusion step may be the finished product of the permanent magnet.

After the hot plastic deforming step, the following grain boundary diffusion step may be carried out. The grain boundary diffusion step is a step of attaching a diffusion material containing a heavy rare-earth element to a surface of the magnet base material and heating the diffusing material and the magnet base material. Due to heating of the magnet base material to which the diffusing material is attached, the heavy rare-earth element in the diffusing material diffuses from the surface of the magnet base material to the inside of the magnet base material. The heavy rare-earth element diffuses to the vicinity of the surface of the main phase grains through the grain boundaries inside of the magnet base material. In the vicinity of the surface of the main phase grains, a part of the light rare-earth element (Nd or the like) is substituted with the heavy rare-earth element. When the heavy rare-earth element locally exists in the vicinity of the surface of the main phase grains and the grain boundaries, an anisotropic magnetic field locally increases in the vicinity of the grain boundaries, and a nucleus of magnetization reversal is less likely to occur in the vicinity of the grain boundaries. As a result, a permanent magnet having a high coercivity is obtained.

A temperature (diffusion temperature) of the diffusion material and the magnet base material in the grain boundary diffusion step may be, for example, from 550° C. to 900° C. A time (diffusion time) for which the diffusion temperature is maintained in the above-described range may be, for example, from one minute to 1440 minutes.

The diffusing material may include at least one kind of heavy rare-earth element between Tb and Dy. The diffusing material may further include at least one light rare-earth element between Nd and Pr in addition to the heavy rare-earth element. The diffusing material may further include Cu in addition to the heavy rare-earth element and the light rare-earth element. For example, the diffusing material may be a metal consisting of one kind of the above-described element, a hydride of one kind of the above-described element, an alloy containing a plurality of kinds of the above-described elements, or a hydride of the alloy. The diffusing material may be a powder. In the grain boundary diffusion step, a slurry containing the diffusing material and an organic solvent may be applied to the surface of the magnet base material. In the grain boundary diffusion step, the surface of the magnet base material may be covered with a sheet containing the diffusing material and a binder. In the grain boundary diffusion step, the surface of the magnet base material may be covered with an alloy foil (ribbon) composed of the diffusing material.

To promote diffusion of the diffusing material, the surface of the magnet base material may be polished before the grain boundary diffusion step. To remove the diffusing material remaining on the surface of the magnet base material after the grain boundary diffusion step, the surface of the magnet base material after the grain boundary diffusion step may be polished.

Dimensions and a shape of the magnet base material may be adjusted by grinding and polishing the magnet base material, or the like. A passive layer may be formed on the surface of the magnet base material by oxidation or a chemical treatment of the surface of the magnet base material. The surface of the magnet base material may be covered with a protective film such as a resin film. Corrosion resistance of the permanent magnet is improved by the passive layer or the protective film.

The present invention is not necessarily limited to the above-described embodiment. Various modifications of the present invention can be made within a range not departing from the gist of the present invention, and modification examples thereof are also included in the present invention.

EXAMPLES

The present invention will be described in detail by the following examples and comparative examples. The present invention is not limited to the following examples.

<Preparation of Permanent Magnet>

Example 1

Each step in the following Example 1 was carried out in a non-oxidizing atmosphere (Ar gas).

In a ribbon preparation step, an alloy powder (alloy ribbon) was prepared from a raw material metal by the rapid-solidification method. The raw material metal (molten metal) used in the ribbon preparation step included Nd, Fe, Co, Ga, Al, and B.

A content of Nd in the raw material metal was 30.17 mass %.

A content of Co in the raw material metal was 3.96 mass %.

A content of Ga in the raw material metal was 0.59 mass %.

A content of Al in the raw material metal was 0.04 mass %.

A content of B in the raw material metal was 0.97 mass %.

A balance of the raw material metal except for Nd, Co, Ga, Al, and B was Fe.

In the hot pressing step, the alloy powder inside the mold was compressed with the mold while being heated to prepare a green compact. The green compact was a rectangular parallelepiped. Dimensions of the green compact were 22 mm×11 mm×80 mm. A hot pressing temperature $T_{HP}$ was 750° C. A hot pressing pressure PHP was 100 MPa. A hot pressing time was 300 seconds.

The hot plastic deforming step subsequent to the hot pressing step was carried out. In the hot plastic deforming step, the permanent magnet was prepared through hot extrusion of the green compact by using the above-described mold (mold in which the cavity 10 shown in FIG. 5 is formed).

The length xa of the first side at the inlet of the mold (the inlet side region 10A) was 22 mm.

The length ya of the second side at the inlet of the mold (the inlet side region 10A) was 11 mm.

The temperature Ti of the inlet of the mold (a temperature of the inlet side region 10A) was maintained to a value shown in the following Table 1.

The length xc1 of the first side at the first outlet (outlet of the intermediate region 10B) was 7 mm.

The length yc1 of the second side at the first outlet (outlet of the intermediate region 10B) was 30 mm.

The temperature $T_1$ of the first outlet (temperature of the intermediate region 10B) was maintained to a value shown in the following Table 1.

The length xc2 of the first side at the second outlet (outlet of the extrusion port side region 10C) was 7 mm.

The length yc2 of the second side at the second outlet (outlet of the extrusion port side region 10C) was a value shown in the following Table 1.

The temperature $T_2$ of the second outlet (temperature of the outlet of the extrusion side region 10C) was maintained to a temperature shown in the following Table 1.

The hot plastic deforming pressure (maximum pressure) was 60 MPa.

The extrusion rate in the hot extrusion was 1 mm/second.

A permanent magnet of Example 1 was prepared by the above-described method. A direction of the first side was equal to the easy magnetization axis direction C of the permanent magnet. A direction of the second side was equal to the AB direction of the permanent magnet. The width t of the permanent magnet in the easy magnetization axis direction C was 7 mm.

Examples 2 to 5, and Comparative Examples 1 to 7

In the ribbon preparation step of each of Example 4, and Comparative Examples 6 and 7, the following raw material metal (molten metal) different from that of Example 1 was used.

The raw material metal included Pr and Dy in addition to Nd, Fe, Co, Ga, Al, and B.

A content of Nd in the raw material metal was 10.65 mass %.

A content of Pr in the raw material metal was 17.40 mass %.

A content of Dy in the raw material metal was 2.07 mass %.

A content of Co in the raw material metal was 3.40 mass %.

A content of Ga in the raw material metal was 0.50 mass %.

A content of Al in the raw material metal was 0.07 mass %.

A content of B in the raw material metal was 0.97 mass %.

A balance of the raw material metal except for Nd, Pr, Dy, Co, Ga, Al, and B was Fe.

The hot pressing pressure PHP of Example 5 was 150 MPa. That is, in Example 5, further densification of the permanent magnet was attempted by the hot pressing step at a higher pressure. The hot pressing temperature $T_{HP}$ of Comparative Example 5 was 740° C.

The temperature Ti of the inlet of the mold in each of Examples 2 to 5, and Comparative Examples 1 to 7 was maintained to a value shown in the following Table 1.

The temperature T1 of the first outlet in each of Examples 2 to 5, and Comparative Examples 1 to 7 was maintained to a value shown in the following Table 1.

The length yc2 of the second side in the second outlet in each of Examples 2 to 5, and Comparative Examples 1 to 7 was adjusted to a value shown in the following Table 1.

The temperature T2 of the second outlet in each of Examples 2 to 5, and Comparative Examples 1 to 7 was maintained to a temperature shown in the following Table 1.

A permanent magnet of each of Examples 2 to 5, and Comparative Examples 1 to 7 was prepared by a similar method as in Example 1 except for the above-described items.

<Analysis of Permanent Magnet>

(Composition and Microstructure of Permanent Magnet)

A cross-section of the permanent magnet of each of Examples 1 to 5 and Comparative Examples 1 to 7 was observed with a scanning electron microscope (SEM). The observed cross-section of the each permanent magnet was parallel to the easy magnetization axis direction of the each permanent magnet. A composition of the cross-section of the each permanent magnet was analyzed with an electron beam probe micro analyzer (EPMA) and an energy dispersive X-ray spectroscopy (EDS) device.

In any case of Examples 1 to 5, and Comparative Examples 1 to 7, the permanent magnet had the following characteristics.

The permanent magnet contained a plurality of main phase grains ($Nd_2Fe_{14}B$ crystal grains).

A plurality of voids were formed in the permanent magnet.

Each main phase grain observed on the cross-section was flat.

A plurality of the main phase grains were stacked along the easy magnetization axis direction C.

(Measurement on Void)

Figure 7A:
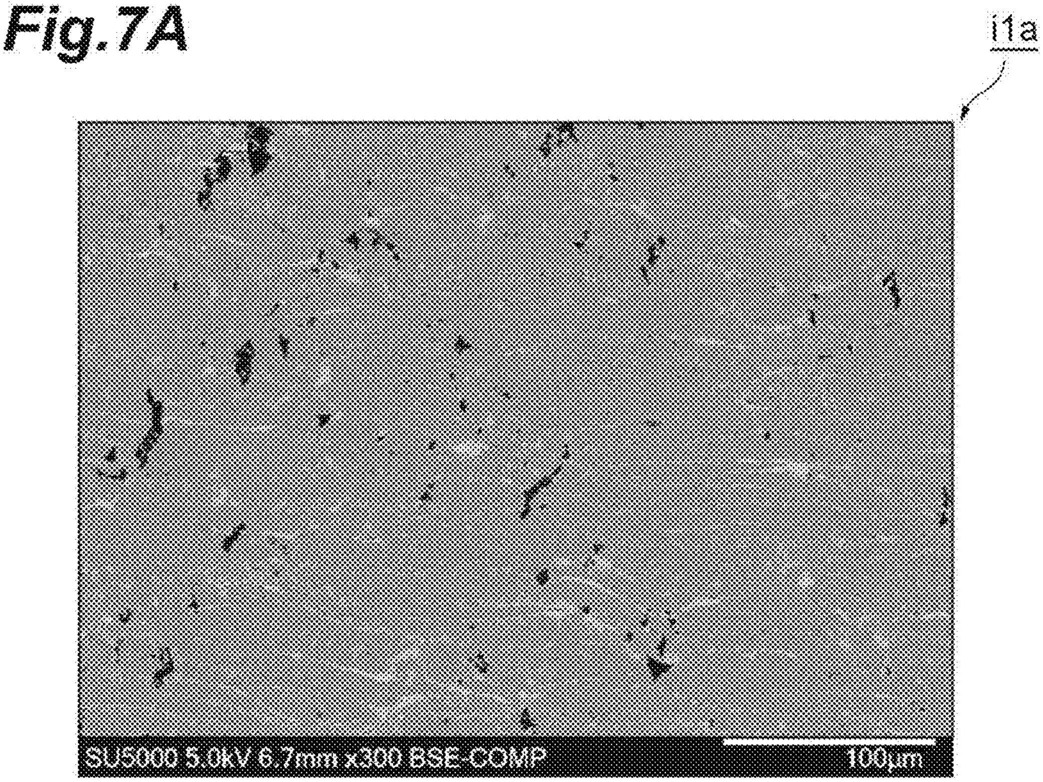
FIG. 7A and FIG. 7B are images relating to a cross-section of Example 1 of the present invention.
Figure 7B:
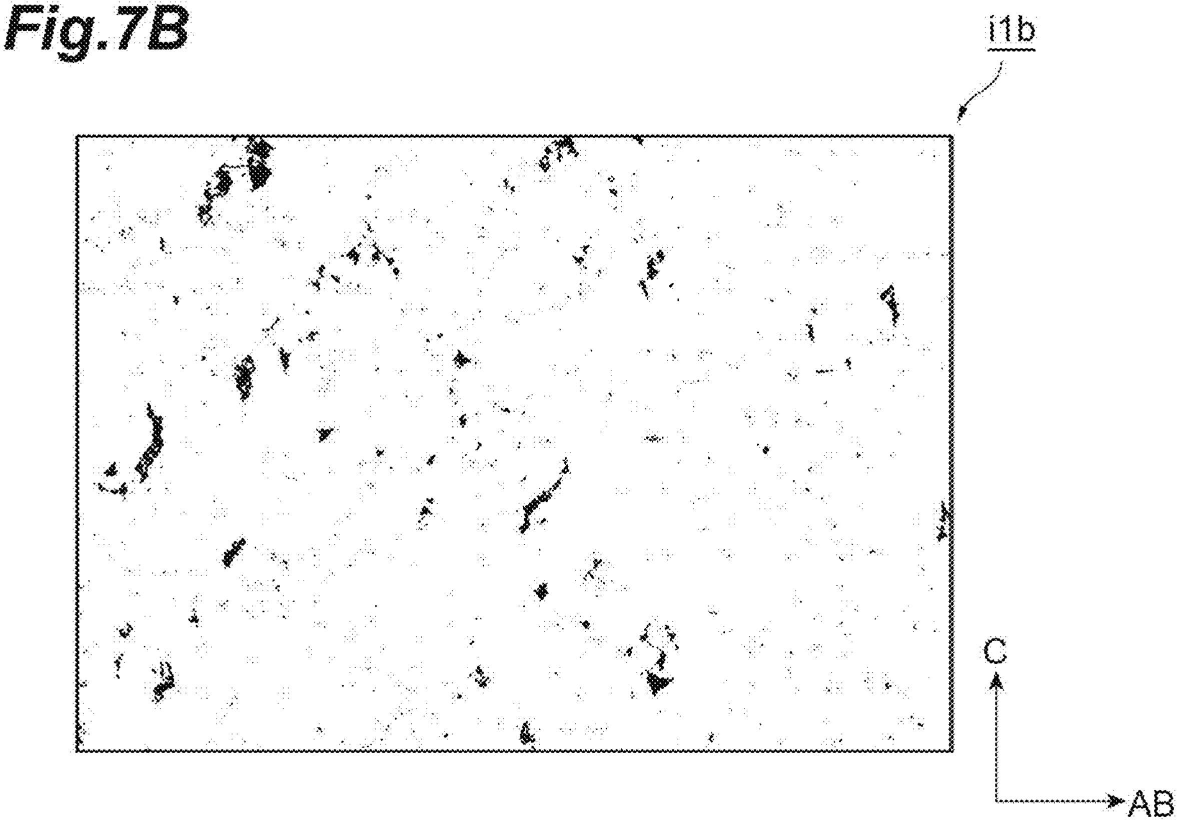
Figure 8A:
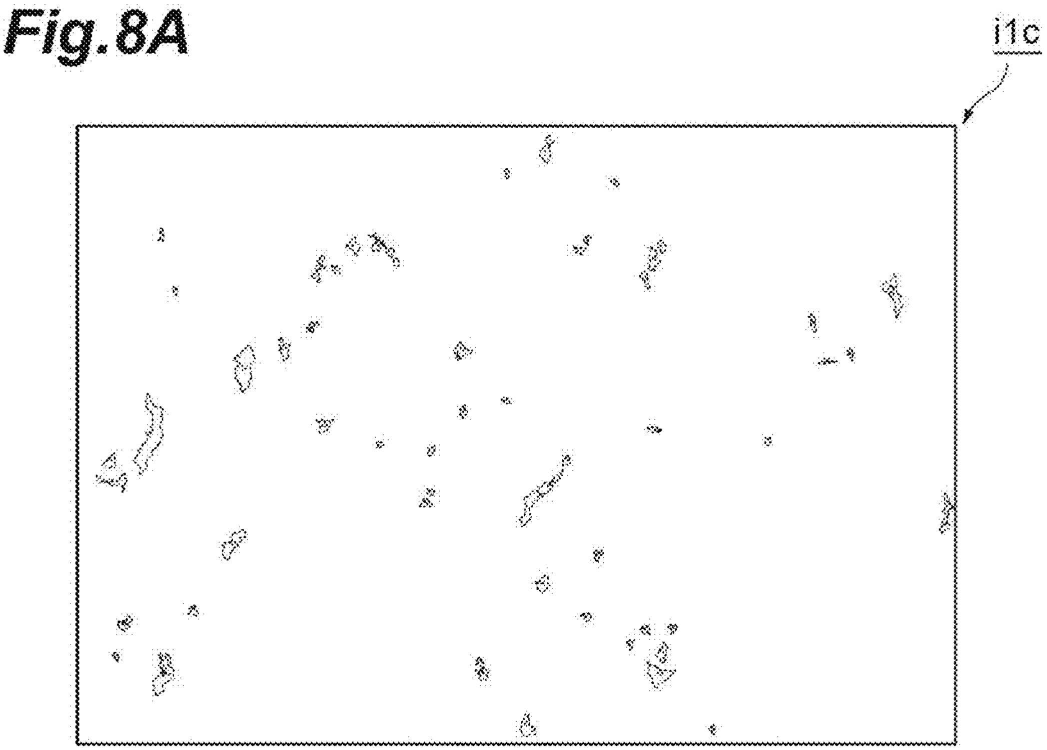
FIG. 8A and FIG. 8B are images relating to the cross-section of Example 1 of the present invention.
Figure 8B:
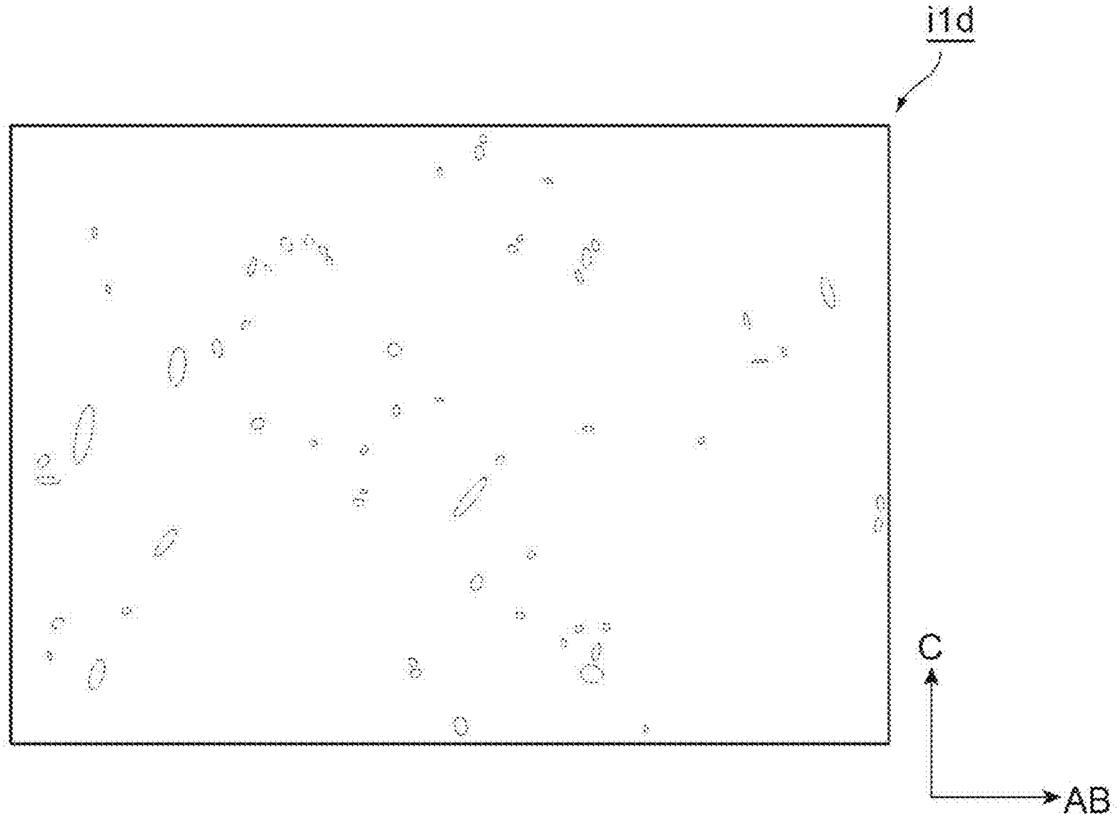

As illustrated in FIG. 7A, a backscattered electron image i1*a* of a part of a cross-section of the permanent magnet of Example 1 was taken by the SEM. The cross-section where the backscattered electron image i1*a* of Example 1 was captured was parallel to the easy magnetization axis direction C. A vertical direction of the backscattered electron image i1*a* was the easy magnetization axis direction C, and a horizontal direction of the backscattered electron image i1*a* was the AB direction. An image i1*b* in FIG. 7B, an image i1*c* in FIG. 8A, and an image i1*d* in FIG. 8B are images obtained from the backscattered electron image i1*a* of Example 1. A vertical direction of each of the image i1*b*, the image i1*c*, and the image i1*d* was the easy magnetization axis direction C. A horizontal direction of each of the image i1*b*, the image i1*c*, and the image i1*d* was the AB direction. Dimensions of one pixel of each of the image i1*b*, the image i1*c*, and the image i1*d* were (⅓) μm×(⅓) μm.

A luminance (unit: arbitrary unit) of a backscattered electron beam at an arbitrary portion of the backscattered electron image i1*a* increases in accordance with an increase in an atomic weight of an element existing at the arbitrary portion. The luminance of the backscattered electron beam at the arbitrary portion of the backscattered electron image i1*a* increases in accordance with an increase in a concentration of an element existing at the arbitrary portion. Accordingly, a relatively bright portion in the backscattered electron image i1*a* is a portion where the concentration of an element (for example, Nd) having a relatively large atomic weight is relatively high. On the other hand, the darkest portion in the backscattered electron image i1*a* is a void where an element does not exist.

A monochrome image i1*b* was obtained by threshold processing (binarization processing) of the backscattered electron image i1*a* based on an RGB (Red-Green-Blue) color model. A dark portion in the monochrome image i1*b* is a void. An area of each void in the monochrome image i1*b* was measured. An area ratio AR of voids in the cross-section (backscattered electron image i1*a*) of the permanent magnet was calculated on the basis of the measured area of each void. The area ratio AR of Example 1 is shown in Table 1.

A contour of each of the voids in the image i1*b* was specified by image processing of the monochrome image i1*b*. Each of a plurality of closed curves included in the image i1*c* corresponds to a contour of each of the voids in the image i1*b*. In the image processing of the monochrome image i1*b*, a portion where an area is 16.67 (μm) 2 or less among dark portions in the monochrome image i1*b* was removed from the image as a noise. In the image processing of the monochrome image i1*b*, a void that is discontinuous at an end of the image was removed from the image.

The image i1*d* was obtained by approximating the contour of each of the voids in the image i1*c* by an ellipse. Approximation of the contour of each of the voids by the ellipse was carried out by least squares fitting. A long axis direction (that is, the direction VD in which each of the voids 8 extends) of the ellipse by which the contour of each of the voids in the image i1*d* was approximated was specified. In addition, an angle θ between the AB direction and the VD of each of the voids was measured. Since the direction VD in which the void approximated by a perfect circle extends cannot be defined, the void approximated by the perfect circle was excluded from a measurement target of the angle θ.

The above-described image processing of Example 1 was carried out by Image J that is an image processing software of a public domain.

Figure 9A:
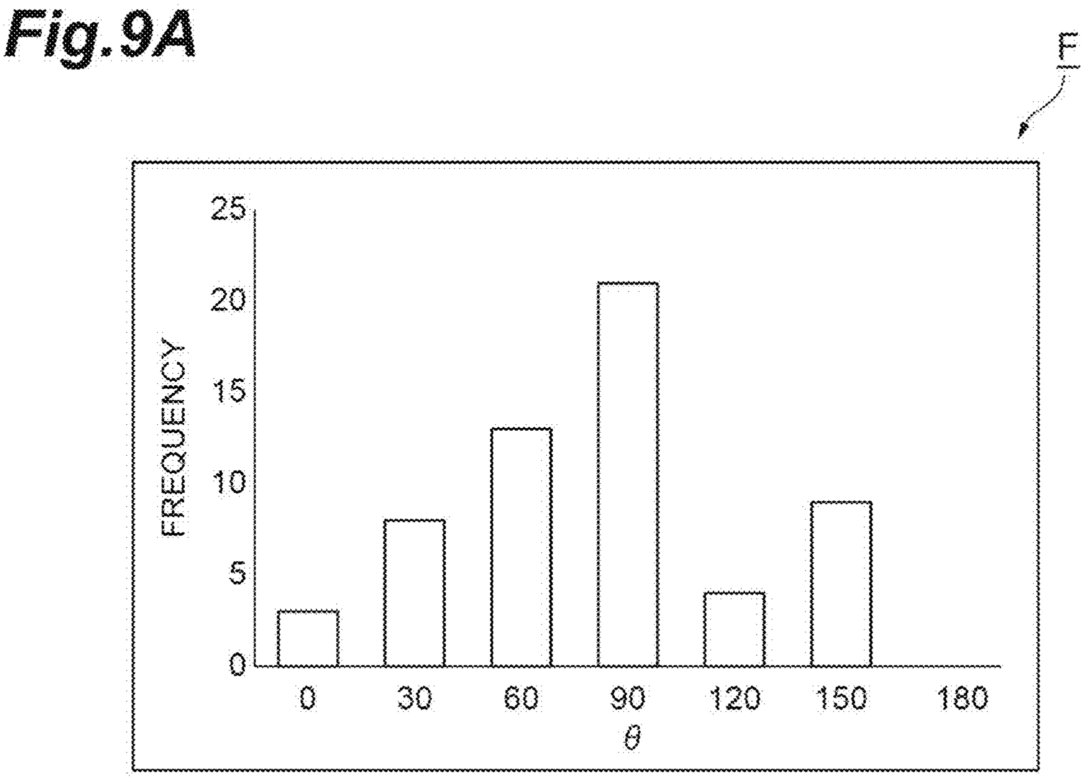
FIG. 9A and FIG. 9B are frequency distributions of the plurality of voids in the cross-section of Example 1 of the present invention.
Figure 9B:
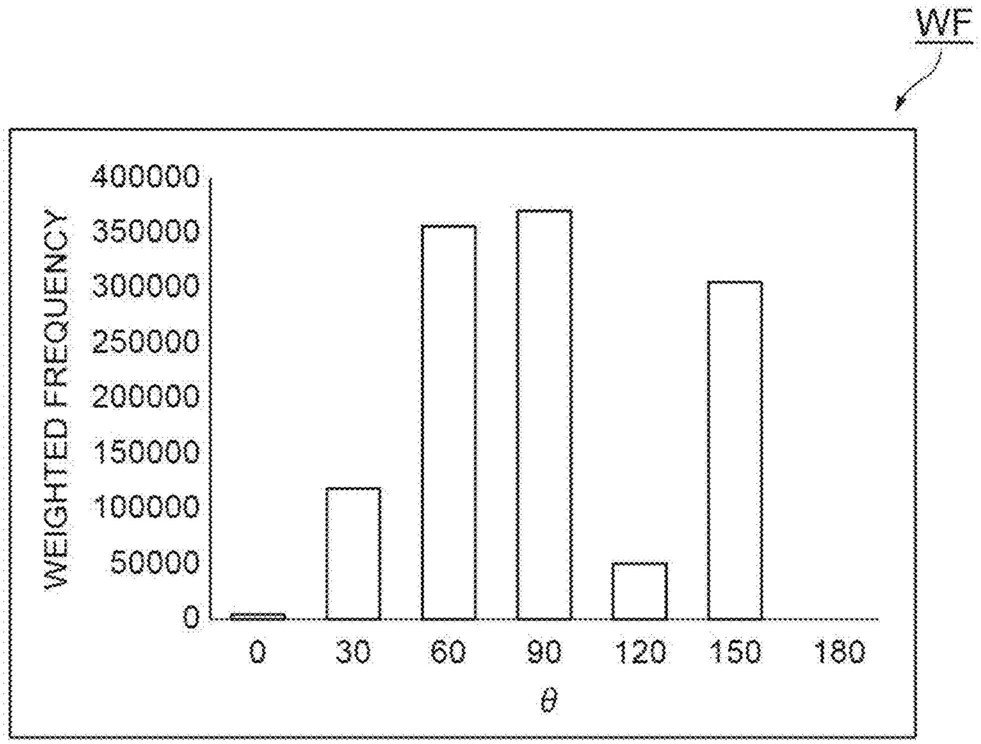

A frequency distribution F of the voids in the backscattered electron image i1*a* (cross-section that is approximately parallel to the easy magnetization axis direction C) was obtained on the basis of the image processing of Example 1. Furthermore, a weighted frequency distribution WF of voids weighted by an area of each void was obtained. A horizontal axis of each of the frequency distribution F and the weighted frequency distribution WF represents θ. The frequency distribution F of Example 1 is illustrated in FIG. 9A. The weighted frequency distribution WF of Example 1 is illustrated in FIG. 9B.

Capturing and image processing of a backscattered electron image were carried out in a surface portion exposed on the cross-section of the permanent magnet of Example 1 by a similar method as described above. The surface portion was a portion where a depth from a surface of the permanent magnet in the easy magnetization axis direction C was from 0 mm to 1.75 mm. The area ratio ARs of the voids in the surface portion was calculated on the basis of the capturing and the image processing of the backscattered electron image in the surface portion.

Capturing and image processing of a backscattered electron image were carried out in a central portion exposed on the cross-section of the permanent magnet of Example 1 by a similar method as described above. The central portion is a portion where a depth from the surface of the permanent magnet in the easy magnetization axis direction C is more than 1.75 mm and 3.5 mm or less. The area ratio ARc of the voids in the central portion was calculated on the basis of the capturing and the image processing of the backscattered electron image in the central portion.

ARs, ARc, an average value of ARs and ARc, and ARs-ARc of Example 1 are shown in the following Table 3.

The area ratio AR, the frequency distribution F, and the weighted frequency distribution WF of each of Examples 2 to 5, and Comparative Examples 1 to 7 were obtained by a similar method as in Example 1.

The area ratio AR of each of Examples 2 to 5, and Comparative Examples 1 to 7 is shown in the following Table 1.

"θ-F" in the following Table 1 represents a range of θ including an angle $\theta_{Fmax}$ at which the frequency is the maximum value Fmax in the frequency distribution F.

"θ-WF" in the following Table 1 represents a range of θ including an angle $\theta_{WFmax}$ at which the weighted frequency is the maximum value WFmax in the weighted frequency distribution WF.

"0 to 30" in the following Table 1 represents "0° or more and less than 30°".

"30 to 60" in the following Table 1 represents "30° or more and less than 60°".

"60 to 90" in the following Table 1 represents "from 60° to 90°".

"90 to 120" in the following Table 1 represents "from 90° to 120°".

"120 to 150" in the following Table 1 represents "more than 120° and 150° or less".

"150 to 180" in the following Table 1 represents "more than 150° and 180° or less".

N/Acs in the following Table 1 represents a number of the C axis extending voids per unit area of the backscattered electron image (cross-section of the permanent magnet). Details of the definition of N/Acs are as described above.

$A_{60-120}$/Acs in the following Table 1 represents a ratio of the sum of area of the C axis extending void to the area of the backscattered electron image (cross-section of the permanent magnet). Details of the definition of $A_{60-120}$/Acs are as described above.

In a case of Comparative Examples 1 and 2, since the number of voids was very small, it was difficult to accurately specify θ-F and θ-WF.

In a case of Comparative Example 6, the C axis extending void was not detected.

ARs and ARc of Example 5 were calculated by a similar method as in Example 1. ARs, ARc, an average value of ARs and ARc, and ARs-ARc of Example 5 are shown in the following Table 3.

(Electric Resistivity of Permanent Magnet)

A sample for measurement of the electric resistivity was prepared from the permanent magnet of Example 1. The sample was a rectangular parallelepiped. Dimensions of the sample were 10.0 mm (vertical)×1.0 mm (horizontal)×0.5 mm (thickness). A thickness direction (direction of a side having a length of 0.5 mm) was the easy magnetization axis direction C of the sample. An electric resistivity p of the sample in a direction orthogonal to the easy magnetization axis direction C was measured by a four-probe method. In the four-probe method, tip ends of four probes were pressed against the surface of the sample. The surface of the sample against which the four probes were pressed was a surface (having dimensions of 10.0 mm (vertical)×1.0 mm (horizontal)) orthogonal to the easy magnetization axis direction C. An interval of the probes was 1.5 mm. A measurement current was adjusted to 100 mA. In the measurement of the electric resistivity by the four-probe method, a resistivity meter (Loresta GP) produced by Nittoseiko Analytech Co., Ltd. (former Mitsubishi Chemical Analytech Co., Ltd.) was used.

An electric resistivity p of each of Examples 2 to 5, and Comparative Examples 1 to 7 was measured by a similar method as in Example 1. The electric resistivity p of each of Examples 1 to 5, and Comparative Examples 1 to 7 is shown in the following Table 2.

(Magnetic Characteristics of Permanent Magnet)

A coercivity, a residual magnetic flux density, and a squareness ratio of the permanent magnet of each of Examples 1 to 5, and Comparative Examples 1 to 7 were measured. The coercivity, the residual magnetic flux density, and the squareness ratio were measured by a BH tracer. As the coercivity, a coercivity ($HcJ_{23}$) at 23° C. and a coercivity ($HcJ_{150}$) at 150° C. were measured. The residual magnetic flux density (Br) was measured at room temperature. The squareness ratio (Hk/HcJ) was measured at 23° C. Measured values of the magnetic characteristics, and a temperature coefficient β of the coercivity of the each permanent magnet are shown in the following Table 2. The definition of the temperature coefficient β is as described above.

TABLE 1

| | | | | | | | | Void | | | | |
|---|---|---|---|---|---|---|---|---|---|---|---|---|
| | | | Mold (hot plastic pressing) | | | | | Area | Frequency | | Weighted frequency | |
| | | | Inlet | First outlet | | Second outlet | | ratio | distribution F | | distribution WF | |
| Unit | $T_{HP}$ ° C. | $P_{HP}$ MPa | Ti ° C. | yc1 mm | T1 ° C. | yc2 mm | T2 ° C. | AR % | θ-F degree | N/Acs Piece/(mm)$^2$ | θ-WF degree | $A_{60-120}$/Acs % |
| Comparative Example 1 | 750 | 100 | 780 | 30.00 | 780 | 30.000 | 780 | 0.19 | — | 7.8 | — | 0.01 |
| Comparative Example 2 | 750 | 100 | 780 | 30.00 | 780 | 30.000 | 780 | 0.19 | — | 7.8 | — | 0.01 |
| Comparative Example 3 | 750 | 100 | 780 | 30.00 | 780 | 30.000 | 750 | 1.39 | 30-60 | 15.6 | 120-150 | 0.02 |
| Example 1 | 750 | 100 | 780 | 30.00 | 780 | 30.010 | 750 | 1.83 | 90-120 | 265.6 | 90-120 | 0.72 |
| Example 2 | 750 | 100 | 780 | 30.00 | 780 | 30.030 | 750 | 4.91 | 90-120 | 742.2 | 90-120 | 2.44 |
| Comparative Example 4 | 750 | 100 | 780 | 30.00 | 780 | 30.060 | 750 | 7.83 | 30-60 | 46.9 | 120-150 | 0.11 |
| Example 3 | 750 | 100 | 780 | 30.00 | 780 | 30.005 | 750 | 1.30 | 90-120 | 210.9 | 90-120 | 0.62 |
| Comparative Example 5 | 740 | 100 | 780 | 30.00 | 780 | 30.000 | 780 | 2.02 | 0-30 | 23.4 | 120-150 | 0.04 |
| Comparative Example 6 | 750 | 100 | 790 | 30.00 | 790 | 30.000 | 790 | 0.14 | — | 0.0 | — | 0.00 |
| Comparative Example 7 | 750 | 100 | 790 | 30.00 | 790 | 30.000 | 760 | 1.10 | 120-150 | 23.4 | 150-180 | 0.02 |

TABLE 1-continued

| Unit | $T_{HP}$ ° C. | $P_{HP}$ MPa | Mold (hot plastic pressing) Inlet Ti ° C. | First outlet yc1 mm | First outlet T1 ° C. | Second outlet yc2 mm | Second outlet T2 ° C. | Void Area ratio AR % | Frequency distribution F θ-F degree | Frequency distribution F N/Acs Piece/(mm)$^2$ | Weighted frequency distribution WF θ-WF degree | Weighted frequency distribution WF $A_{60-120}$/Acs % |
|---|---|---|---|---|---|---|---|---|---|---|---|---|
| Example 4 | 750 | 100 | 790 | 30.00 | 790 | 30.010 | 760 | 1.42 | 60-90 | 281.3 | 90-120 | 0.79 |
| Example 5 | 750 | 150 | 780 | 30.00 | 780 | 30.010 | 750 | 1.37 | 90-120 | 187.5 | 90-120 | 0.64 |

TABLE 2

| Unit | Void AR % | θ-F degree | N/Acs Piece/(mm)$^2$ | θ-WF degree | $A_{60-120}$/Acs % | Magnetic characteristics ρ μΩ · cm | $HcJ_{23}$ kA/m | $HcJ_{150}$ kA/m | β %/° C. | Br mT | Hk/HcJ % |
|---|---|---|---|---|---|---|---|---|---|---|---|
| Comparative Example 1 | 0.19 | — | 7.8 | — | 0.01 | 1.51 | 694 | 249 | −0.50 | 1286 | 95.2 |
| Comparative Example 2 | 0.19 | — | 7.8 | — | 0.01 | 1.53 | 701 | 252 | −0.50 | 1280 | 95.1 |
| Comparative Example 3 | 1.39 | 30-60 | 15.6 | 120-150 | 0.02 | 1.65 | 718 | 251 | −0.51 | 1243 | 91.2 |
| Example 1 | 1.83 | 90-120 | 265.6 | 90-120 | 0.72 | 1.83 | 800 | 323 | −0.47 | 1269 | 97.2 |
| Example 2 | 4.91 | 90-120 | 742.2 | 90-120 | 2.44 | 2.29 | 868 | 333 | −0.49 | 1259 | 94.0 |
| Comparative Example 4 | 7.83 | 30-60 | 46.9 | 120-150 | 0.11 | 2.55 | 709 | 228 | −0.53 | 1201 | 84.1 |
| Example 3 | 1.30 | 90-120 | 210.9 | 90-120 | 0.62 | 1.78 | 828 | 303 | −0.50 | 1249 | 94.8 |
| Comparative Example 5 | 2.02 | 0-30 | 23.4 | 120-150 | 0.04 | 1.67 | 713 | 229 | −0.53 | 1229 | 87.5 |
| Comparative Example 6 | 0.14 | — | 0.0 | — | 0.00 | 1.58 | 517 | 139 | −0.58 | 1217 | 91.7 |
| Comparative Example 7 | 1.10 | 120-150 | 23.4 | 150-180 | 0.02 | 1.52 | 982 | 354 | −0.50 | 1217 | 91.5 |
| Example 4 | 1.42 | 60-90 | 281.3 | 90-120 | 0.79 | 1.89 | 1113 | 473 | −0.45 | 1248 | 99.5 |
| Example 5 | 1.37 | 90-120 | 187.5 | 90-120 | 0.64 | 1.88 | 802 | 326 | −0.47 | 1278 | 98.0 |

TABLE 3

| Unit | ARs % | ARc % | Average value % | ARS-ARc % |
|---|---|---|---|---|
| Example 1 | 2.58 | 1.08 | 1.83 | 1.50 |
| Example 5 | 1.72 | 1.01 | 1.37 | 0.71 |

INDUSTRIAL APPLICABILITY

For example, the R-T-B based permanent magnet according to the present invention is suitable for a magnet constituting a rotor of an IPM motor or a SPM motor.

REFERENCE SIGNS LIST

2: R-T-B based permanent magnet, 2*cs*: cross-section of permanent magnet, 4: main phase grain, 8: void, C: easy magnetization axis direction, AB: direction that is approximately orthogonal to easy magnetization axis direction, F: frequency distribution of void.

What is claimed is:

1. An R-T-B based permanent magnet including a rare-earth element R, a transition metal element T, and B, wherein the R-T-B based permanent magnet includes at least Nd as the R, the R-T-B based permanent magnet includes at least Fe as the T, the R-T-B based permanent magnet contains a plurality of main phase grains, the plurality of main phase grains includes at least the R, the T, and B, a plurality of voids are formed in a cross-section of the R-T-B based permanent magnet, the cross-section is approximately parallel to an easy magnetization axis direction of the R-T-B based permanent magnet, an area ratio of the plurality of voids in the cross-section is from 1% to 5%, a direction orthogonal to the easy magnetization axis direction in the cross-section is expressed as AB direction, a direction in which each of the plurality of voids extends in the cross-section is expressed as VD, an angle between the AB direction and the VD is expressed as θ, a horizontal axis of a frequency distribution of the plurality of voids in the cross-section represents the θ, a range of the horizontal axis of the frequency distribution is from 0° to 180°, and the frequency distribution is maximum in a range of θ of from 60° to 120°.

2. The R-T-B based permanent magnet according to claim 1, wherein the plurality of main phase grains are flat in the cross-section, and the plurality of main phase grains are stacked along the easy magnetization axis direction.

3. The R-T-B based permanent magnet according to claim 1, wherein an average value of a length of a short axis of the plurality of main phase grains in the cross-section is from 20 nm to 200 nm.

4. The R-T-B based permanent magnet according to claim 1, wherein a content of R is from 28 mass % to 33 mass %, and a content of B is from 0.8 mass % to 1.1 mass %.

5. The R-T-B based permanent magnet according to claim 1, wherein the R-T-B based permanent magnet is a hot deformed magnet.

6. The R-T-B based permanent magnet according to claim 1, wherein a width of the R-T-B based permanent magnet in the easy magnetization axis direction is expressed as t, a surface portion of the R-T-B based permanent magnet is defined as a portion where a depth from a surface of the R-T-B based permanent magnet in the easy magnetization axis direction is from 0 to 0.25t, an area ratio of the plurality of voids in the surface portion is expressed as ARs %, the ARs is measured in the surface portion exposed on the cross-section, a central portion of the R-T-B based permanent magnet is defined as a portion where the depth from the surface of the R-T-B based permanent magnet in the easy magnetization axis direction is more than 0.25t and 0.5t or less, an area ratio of the plurality of voids in the central portion is expressed as ARc %, the ARc is measured in the central portion exposed on the cross-section, and ARs-ARc is from 1.0% to 4.0%.

* * * * *